(12) United States Patent
Morris et al.

(10) Patent No.: US 9,845,067 B2
(45) Date of Patent: Dec. 19, 2017

(54) FRONTAL AIRBAG SYSTEMS FOR OBLIQUE CRASH PROTECTION

(71) Applicant: Autoliv ASP, Inc., Ogden, UT (US)

(72) Inventors: Christina Morris, Auburn Hills, MI (US); Don Paxton, Romeo, MI (US); Michael Kutchey, Ortonville, MI (US); Harry Park, Bloomfield Hills, MI (US); Dion Kruse, Alingsas (SE)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 14/839,545

(22) Filed: Aug. 28, 2015

(65) Prior Publication Data

US 2017/0057453 A1   Mar. 2, 2017

(51) Int. Cl.
*B60R 21/233* (2006.01)
*B60R 21/203* (2006.01)
*B60R 21/239* (2006.01)

(52) U.S. Cl.
CPC .......... *B60R 21/233* (2013.01); *B60R 21/203* (2013.01); *B60R 21/239* (2013.01); *B60R 2021/23308* (2013.01); *B60R 2021/23324* (2013.01)

(58) Field of Classification Search
CPC ... B60R 21/233; B60R 21/203; B60R 21/239; B60R 2021/23308; B60R 2021/23324
See application file for complete search history.

(56) References Cited

U.S. PATENT DOCUMENTS

| 3,618,979 | A | | 11/1971 | Gulette |
| 3,752,501 | A | * | 8/1973 | Daniel ................. B60R 21/233 280/729 |
| 5,529,337 | A | | 6/1996 | Takeda et al. |
| 5,577,765 | A | * | 11/1996 | Takeda ................. B60R 21/233 280/729 |
| 6,086,092 | A | * | 7/2000 | Hill ...................... B60R 21/233 280/729 |
| 6,254,121 | B1 | | 7/2001 | Fowler et al. |
| 6,419,262 | B1 | * | 7/2002 | Fendt ................... B60R 21/231 280/729 |

(Continued)

FOREIGN PATENT DOCUMENTS

DE   10301715 A1   7/2004
EP   0657329        6/1995

(Continued)

OTHER PUBLICATIONS

Office Action mailed Jul. 11, 2016, in U.S. Appl. No. 14/880,657, filed Oct. 12, 2015.

*Primary Examiner* — Drew J Brown
(74) *Attorney, Agent, or Firm* — Stoel Rives LLP

(57) ABSTRACT

An inflatable airbag system can be configured to be mounted to a frontal region of a vehicle. The inflatable airbag system includes an airbag base cushion and one or more pluralities of cushion portions. In response to a collision event, the base cushion and pluralities of cushion portions may transition from a compact state to a deployed and expanded state. The airbag may receive the head of a vehicle occupant. One or more inner cushion portions may deflate as they receive the head of the vehicle occupant. An outer plurality of cushion portions may be configured to maintain a fully expanded state as they receive the head of the vehicle occupant.

18 Claims, 16 Drawing Sheets

(56) References Cited

U.S. PATENT DOCUMENTS

| | | | |
|---|---|---|---|
| 6,554,313 B2 | 4/2003 | Uchida | |
| 6,786,504 B2 | 9/2004 | Lorenz et al. | |
| 7,195,275 B2 | 3/2007 | Abe | |
| 7,631,891 B2* | 12/2009 | Washino | B60R 21/203 280/731 |
| 8,876,153 B2 | 11/2014 | Dix | |
| 2006/0006631 A1* | 1/2006 | Meissner | B60R 21/231 280/729 |
| 2006/0163848 A1 | 7/2006 | Abe | |
| 2006/0175819 A1* | 8/2006 | Abe | B60R 21/231 280/743.2 |
| 2009/0224519 A1 | 9/2009 | Fukawatase et al. | |
| 2013/0313809 A1* | 11/2013 | Yamaji | B60R 21/203 280/729 |
| 2014/0175778 A1 | 6/2014 | Choi et al. | |
| 2014/0239617 A1* | 8/2014 | Dix | B60R 21/233 280/728.2 |
| 2014/0375035 A1 | 12/2014 | Fukawatase et al. | |
| 2015/0175116 A1 | 6/2015 | Cho et al. | |
| 2015/0298643 A1 | 10/2015 | Schneider et al. | |
| 2015/0307055 A1 | 10/2015 | Cheng et al. | |
| 2015/0321636 A1 | 11/2015 | Jang | |
| 2016/0046257 A1 | 2/2016 | Yamada et al. | |
| 2017/0015266 A1 | 1/2017 | El-Jawahri et al. | |

FOREIGN PATENT DOCUMENTS

| | | |
|---|---|---|
| GB | 2192841 A | 1/1988 |
| GB | 2415665 A | 1/2006 |
| WO | WO97/04783 A1 | 9/1997 |

* cited by examiner

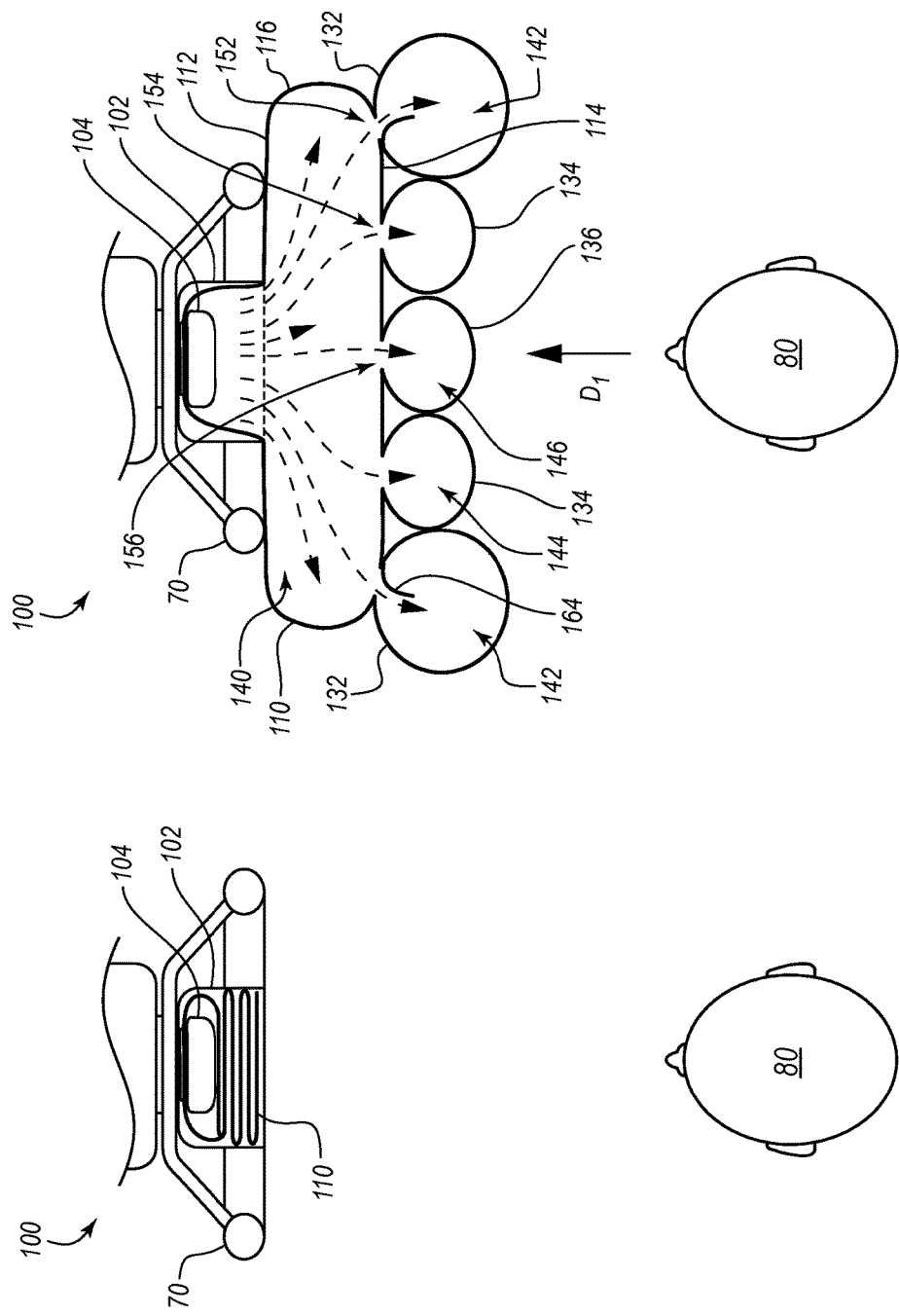

FRONTAL AIRBAG SYSTEMS FOR OBLIQUE CRASH PROTECTION

TECHNICAL FIELD

The present disclosure relates generally to the field of automotive protective systems. More specifically, the present disclosure relates to frontal airbag systems that are configured to deploy from a steering wheel in response to frontal and oblique collision events.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments and are, therefore, not to be considered limiting of the disclosure's scope, the embodiments will be described and explained with specificity and detail in reference to the accompanying drawings, in which:

FIG. 3A is a top view of the inflatable airbag system of FIG. 1A, depicting the airbag prior to deployment.

FIG. 3B is another top view of the inflatable airbag system of FIG. 1A, depicting the airbag in a deployed configuration in response to a collision event.

DETAILED DESCRIPTION

Figure 1A:
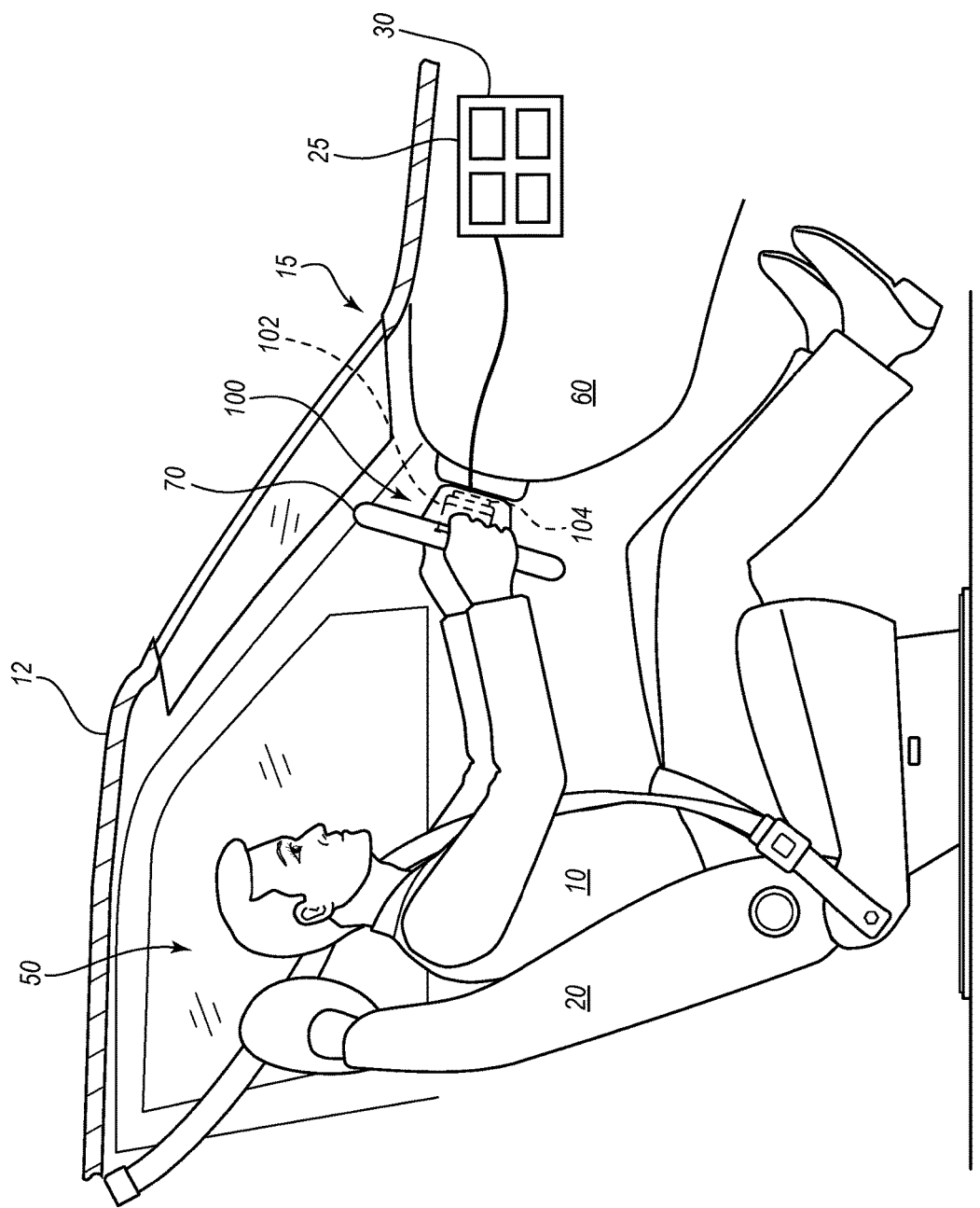
FIG. 1A is a side view of an interior of a vehicle having an inflatable airbag system depicted in a compact state, according to one embodiment of the present disclosure.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "coupled to" and "in communication with" refer to any form of interaction between two or more entities, including mechanical, electrical, magnetic, electromagnetic, fluid, and thermal interaction. Two components may be coupled to each other even though they are not in direct contact with each other. The terms "abut" and "abutting" refer to items that are in direct physical contact with each other, although the items may not necessarily be attached together.

Inflatable airbag systems are widely used to reduce or minimize occupant injury during a collision event. Airbag modules have been installed at various locations within a vehicle, including, but not limited to, in the steering wheel, in the dashboard and/or instrument panel, within the side doors or side seats, adjacent to a roof rail of the vehicle, in an overhead position, or at the knee or leg position. In the following disclosure, "airbag" generally refers to an inflatable front airbag, such as, for example, a driver airbag that is typically housed within a steering wheel, although the principles discussed may apply to other types of airbags (e.g., passenger airbags, instrument panel airbags, knee airbags, and side airbags).

Front airbags are often installed in a steering wheel, dashboard, or instrument panel of a vehicle. As used herein, the terms "dashboard" and "instrument panel" refer to a protruding region of a vehicle faced by a motor vehicle occupant, which often includes a glove compartment in a portion thereof that faces a passenger and may include instruments (e.g., radio and/or climate controls) in a more central region thereof, although such instruments need not be present. During installation, the airbags are typically at an interior of a housing in a packaged state (e.g., are rolled, folded, and/or otherwise compressed) and may be retained in the packaged state behind a cover. During a collision event, an inflator is triggered, which rapidly fills the airbag with inflation gas. The airbag can rapidly transition from the packaged state to an expanded state or configuration. For example, the expanding airbag can open an airbag cover (e.g., by tearing through a burst seam or opening a door-like structure) to exit the housing. The inflator may be triggered by any suitable device or system, and the triggering may be in response to and/or influenced by one or more vehicle sensors.

Certain embodiments of airbag assemblies that are disclosed herein are particularly well suited for use as driver airbags, and may be mounted in a steering wheel. In some embodiments, an airbag assembly includes an airbag comprising multiple portions (e.g., cushions, chambers, regions, sections, or pieces) that are configured to cushion an occupant during a collision event. A base cushion, or base cushion portion can be configured to deploy primarily toward a seating position (e.g., a vehicle occupant position or the position typically occupied by a vehicle occupant or a position in which a vehicle is designed to carry an occupant). This base cushion, or base cushion portion, may be configured to receive the torso and/or the head of a passenger in a collision event.

Additional or supplemental cushions or cushion portions may be in fluid communication with the base cushion of the airbag, and may be configured to deploy primarily in a similar direction as the base cushion. For example, one or more supplemental cushion portions may be configured to receive inflation gas from the base chamber during, or upon, deployment and/or inflation of the base cushion. Further, the supplemental cushions may be disposed on a surface, face, or panel of the base cushion that is positioned or otherwise configured to face toward the seating position.

In some embodiments, one or more cushion portions may be arranged and/or disposed concentric to one another. The supplemental cushion portions may be particularly suited for receiving and cushioning the head of a vehicle occupant during certain types of collision events. Moreover, the supplemental cushions may be configured to prevent the head of a vehicle occupant from sliding off the airbag when the occupant moves in an oblique direction relative to a direction of travel of the vehicle.

Airbags that have multiple cushion portions (e.g., multi-chamber airbags) may provide increased protection to a passenger, as compared with certain airbags that have only a single inflatable portion. For example, in some embodiments, the base cushion or base cushion portion may be configured to receive a vehicle occupant in a frontal collision event that causes the vehicle occupant to move primarily directly forward, as previously stated, and/or primarily in a direction of travel.

One or more supplemental cushion portions may be configured to receive a vehicle occupant during a collision event that causes the vehicle occupant to move in both a forward direction and an inboard direction (e.g., oblique to the direction of travel of the vehicle). The supplemental cushion portions may be configured to prevent the head of the vehicle occupant from disengaging the airbag. Specifically, the cushion portions may prevent the head of a vehicle occupant from sliding in a direction that is oblique to the direction in which the airbag may be configured to deploy.

For example, in some instances an airbag may not provide effective coverage for a vehicle occupant who, during a collision event, travels in a forward and inboard trajectory (which may also be referred to as an angled or oblique trajectory). In some instances, a vehicle occupant may slide off of the airbag cushion during loading of the airbag when the occupant has a forward and inboard trajectory, or the occupant may entirely fail to engage with the cushion. An occupant's inboard (e.g., lateral) trajectory may arise from frontal-impact collisions where the impact is not distributed uniformly across the front plane of the vehicle. Such collisions may be, for example, oblique vehicle-to-vehicle collisions, such as collisions in which, immediately prior to impact, the occupant's vehicle is traveling in a direction that is not substantially parallel to the other vehicle's direction of travel; co-linear vehicle-to-vehicle collisions, such as collisions where, immediately prior to impact, both vehicles are traveling in substantially parallel directions; or collisions with a stationary object. These and other collisions can result in oblique movement of the occupant, which may allow the occupant's head to slide or fall off the cushion of an airbag.

As a vehicle occupant's head falls from the cushion of an airbag, a head twist can result that can cause severe angular velocity of the vehicle occupant's head. Reducing the angular velocity of the head can reduce a risk of head and/or brain injury. Additional concentric cushions and/or cushion portions can aid in reducing the angular velocity of the head. In addition to cushioning the head, supplemental concentric cushions can be configured in such a way to provide more cushion surface contact area around the occupant's head and may be configured to respond to an impact of an occupant's head by deflating to create a pocket or cavity to retain the head. The additional cushion portions may be configured to protrude above a contact surface of the base cushion, and/or the additional cushion portions may be configured to protrude from a front surface of the base cushion to form a primary contact surface of the airbag.

Some embodiments disclosed herein can provide improved positioning, cushioning, and/or safety to occupants involved in particular types of collisions. For example, some embodiments can be particularly suited to cushion a vehicle driver and/or front-seat passengers seated adjacent the passenger-side door. Examples of types of collisions in which certain embodiments may prove advantageous include one or more of (1) collisions where the struck object fails to engage the structural longitudinal components and/or engine block of the occupant's vehicle, (2) collisions where the impact forces act primarily outside of either the left or right longitudinal beams of the occupant's vehicle, (3) collisions classified under the Collision Deformation Classification scheme as FLEE or FREE, (4) front-impact collisions where the occupant's vehicle strikes no more than 25% of the vehicle width, (5) collisions as specified for the Insurance Institute for Highway Safety (IIHS) small overlap frontal crash test, or (6) collisions as specified for the National Highway Traffic Safety Administration (NHTSA) oblique impact test(s). The conditions for the IIHS small overlap front crash test and the NHTSA oblique impact test are disclosed in Insurance Institute for Highway Safety, *Small Overlap Frontal Crashworthiness Evaluation Crash Test Protocol (Version II)* (December 2012) and Saunders, J., Craig, M., and Parent, D., *Moving Deformable Barrier Test Procedure for Evaluating Small Overlap/Oblique Crashes*, SAE Int. J. Commer. Veh. 5(1):172-195 (2012). As used herein, the term "oblique" when used to describe a collision (crash, impact, etc.) is intended to encompass any of the foregoing described collisions and any other collisions in which an occupant's direction of travel as a result of the impact includes both a forward direction or component and a lateral direction or component. In the present disclosure, the longitudinal component of an occupant's post-collision trajectory during or after an oblique collision may be oriented in the car-forward direction.

In some embodiments, the base cushion, or base cushion portion, may be configured to inflate prior to inflation of one or more additional cushions or additional cushion portions. For example, during a deployment event, an inflator may fill a base cushion with gas until the pressure within the base cushion causes inflation gas to flow into the one or more supplementary cushions for deployment. In some embodiments, a base cushion may deploy or begin deployment before the additional cushion portions begin to be deployed.

In certain embodiments, the additional cushion portions can be configured to receive gas via one or more vents that fluidly couple the base and additional cushion portions. The vents may be configured according to various suitable embodiments of an airbag. For example, the one or more vents may include a valve to control the communication of inflation gas. Embodiments may include valves that are one-directional, bidirectional, and/or adaptively closeable, and may restrict airflow between one or more additional cushion portions and the inflatable chamber of the base cushion. Advantages of various embodiments will be evident from the present disclosure.

Figure 1B:
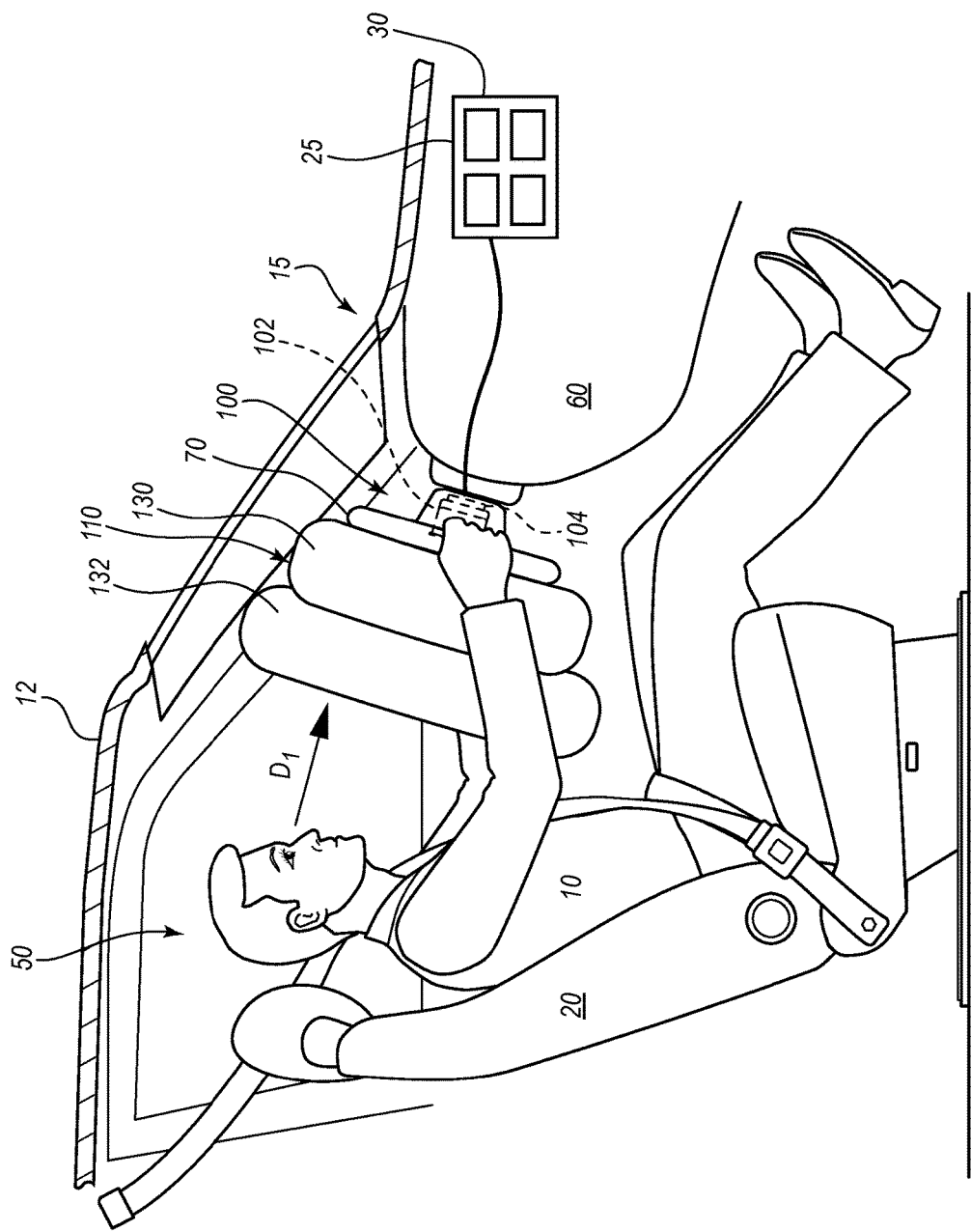
FIG. 1B is another side view of the interior of the vehicle of FIG. 1A with the inflatable airbag system in a deployed configuration.

FIGS. 1A and 1B are side views of an interior of a vehicle, in which an occupant 10 is seated on and/or in a seat 20. In FIG. 1A, the inflatable airbag system 100 is mounted in a steering wheel 70 of the vehicle 12, and is depicted prior to deployment in an undeployed configuration. In FIG. 1B, the inflatable airbag system 100 of FIG. 1A is depicted in a deployed configuration. As can be appreciated, the deployed configuration can also be referred to as a deployed state, inflated state, or inflated configuration.

Referring to FIGS. 1A and 1B collectively, the inflatable airbag system 100 may include an airbag 110 configured to receive inflation gas from an inflator 104 to deploy from an airbag housing 102. The airbag 110 may include a base cushion 130, and at least one supplemental cushion portion 132. The supplemental cushion portion 132 may be coupled with the base cushion 130 and, as shown in FIG. 1B, may be configured to expand toward a seating position 50 to an expanded state or configuration. More specifically, the at least one supplemental cushion portion 132 may be disposed on a rear surface, face, or panel of the base cushion 130 that is positioned or otherwise configured to face toward the seating position 50. The deployed supplemental cushion portion 132 may be configured to receive the vehicle occupant 10 in response to a collision event.

In some embodiments, the inflatable airbag system 100 may be coupled with a control unit 25. The control unit 25 may include one or more impact detection sensors 30 configured to signal the airbag system 100 to deploy in response to a detected impact or detected collision event.

As shown in FIGS. 1A and 1B, the inflatable airbag system 100 can be configured to be mounted to a frontal region 15 of the vehicle 12. For example, in the illustrated embodiment of FIGS. 1A and 1B, the inflatable airbag system 100 is mounted on the driver's side of a vehicle 12, in a steering wheel 70. In other embodiments, the inflatable airbag system 100 can be mounted on the passenger's side of a vehicle 12, for example, in the dashboard 60 or in an instrument panel.

The vehicle 12 may be involved in one or more collision events according to many possible conditions, scenarios, and/or types of collision events which may describe or characterize a specific collision event. For example, a collision event of the vehicle 12 may be characterized according to the velocity of the vehicle 12, the angle of vehicle impact, and/or the movement of one or more vehicle occupants. In some scenarios, the vehicle collision event may be an angled or oblique collision, a head-on collision, a lateral collision, or any possible combination of collision events. During a collision event of the vehicle 12, a vehicle occupant 10 may travel in a direction or trajectory within the vehicle 12, based on the conditions of the collision event.

For example, in an angled or oblique collision the vehicle occupant 10 may move in an inboard oblique direction, or a direction that is both forward and inboard. The forward direction may be toward a steering wheel 70 of the vehicle 12 from, for example, an occupant seating position of the vehicle 12. The inboard direction may be oriented perpendicular to the forward direction and toward a center of the vehicle 12. Certain embodiments of the airbag 110 described herein may be configured to prevent and/or minimize harm to a vehicle occupant 10 during an oblique collision event.

Based on the type of a collision event, the momentum of the vehicle occupant 10 in a first direction of travel $D_1$ may be different from, or similar to, the momentum of the vehicle occupant 10 in a second direction of travel. As described previously, during certain collision events, a vehicle occupant 10 may move in a forward direction and an inboard direction. The forward direction of travel $D_1$ may be parallel with the direction of travel of the vehicle 12, and may be toward the steering wheel 70 of the vehicle 12. The inboard direction may be at least partially perpendicular to the forward direction of travel $D_1$.

In the case of an oblique impact, or oblique collision event, the vehicle occupant 10 may impact the airbag 110, and the airbag 110 may prevent the head of the vehicle occupant 10 from sliding off of the airbag 110. Further, at least one supplemental cushion portion 132 may be configured to receive the vehicle occupant 10.

Figure 2:
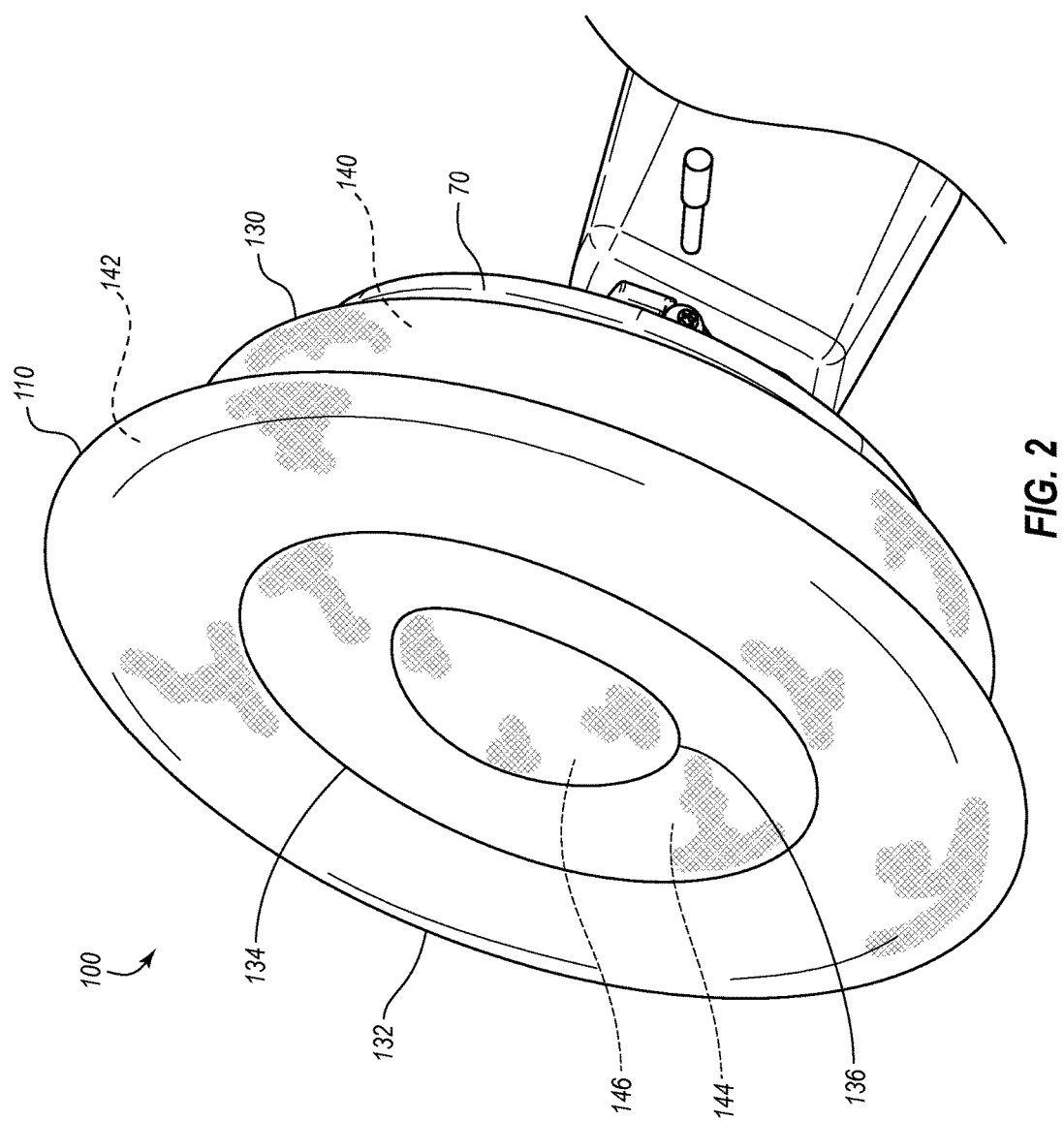
FIG. 2 is a perspective view of the airbag system of FIG. 1A in a deployed configuration.

FIG. 2 is a perspective view of the airbag system 100 of FIG. 1A in a deployed configuration. In the illustrated embodiment of FIG. 2, the airbag 110 includes a base cushion 130, and a plurality of supplemental cushion portions, including a first cushion portion 132, a second cushion portion 134, and a third cushion portion 136. The base cushion 130 may be configured to facilitate inflation and operation of the inflatable airbag system 100. The base cushion 130 may be coupled with a steering wheel 70 of the vehicle 12, and may define an inflatable base chamber 140. In some embodiments, an inflator may be configured to communicate inflation gas to the inflatable base chamber 140. The base cushion 130 may include a plurality of cushion vent apertures (not shown) that communicate inflation gas to one or more of the supplemental cushion portions, including one or more of the first cushion portion 132, the second cushion portion 134, and the third cushion portion 136.

In the embodiment of FIG. 2, the first cushion portion 132 is disposed adjacent to the second cushion portion 134, such that the first cushion portion 132 and the second cushion portion 134 may abut. The second cushion portion 134 is disposed adjacent to the third cushion portion 136, and may abut the third cushion portion 136. The second cushion portion 134 may be ring shaped, with the third cushion portion 136 disposed within an interior of the second cushion portion 134. The second cushion portion 134 and the third cushion portion 136 are disposed on a surface, face, or panel of the base cushion 130 that is positioned or otherwise configured to face toward the seating position The first cushion portion 132, the second cushion portion 134, and the third cushion portion 136 may respectively define a first inflatable chamber 142, a second inflatable chamber 144, and a third inflatable chamber 146. During deployment of the airbag 110, each of the first inflatable chamber 142, the second inflatable chamber 144, and the third inflatable chamber 146 may receive inflation gas from the inflatable base chamber 140 of the base cushion 130. As an inflatable chamber fills with inflation gas it may transition from a compact state to an expanded state or configuration.

For example, during deployment of the airbag 110, an inflator may fill the inflatable base chamber 140 with inflation gas. The inflatable base chamber 140 may communicate inflation gas to each of the first inflatable chamber 142, the second inflatable chamber 144, and the third inflatable chamber 146 via the plurality of cushion vent apertures of the base cushion 130. A sufficient volume of inflation gas may be communicated to each of the chambers 142, 144, 146 to cause each of the first cushion portion 132, the second cushion portion 134, and the third cushion portion 136 to transition from a compact state to an expanded state in a deployed configuration.

In some embodiments, a cushion vent aperture may be said to enable fluid communication between two or more inflatable chambers. In certain embodiments, a cushion vent aperture may be configured to enable fluid communication between the inflatable base chamber 140 and the first inflatable chamber 142. Cushion vent apertures may also enable fluid communication between the inflatable base chamber 140, the second inflatable chamber 144, and/or the third inflatable chamber 146. Stated differently, a cushion vent aperture may provide fluid communication from the base chamber 140 to and/or between the first inflatable chamber 142, the second inflatable chamber 144, and the third inflatable chamber 146. One or more cushion vent apertures may provide fluid communication between any two inflatable chambers (e.g., the inflatable base chamber 140, the first inflatable chamber 142, the second inflatable chamber 144, and/or the third inflatable chamber 146).

In certain embodiments of the airbag 110, the first cushion portion 132 may be coupled with the base cushion 130 of the airbag 110. The first inflatable chamber 142 of the first cushion portion 132 may be in fluid communication with the inflatable base chamber 140 of the base cushion 130 through one or more cushion vent apertures.

In certain embodiments of the airbag 110, the second cushion portion 134 may be coupled with the base cushion 130 of the airbag 110. The second inflatable chamber 144 of the second cushion portion 134 may be in fluid communication with the inflatable base chamber 140 of the base cushion 130 through one or more cushion vent apertures.

In certain embodiments, the third cushion portion 136 may be coupled with the base cushion 130 of the airbag 110. The third inflatable chamber 146 of the third cushion portion 136 may be in fluid communication with the inflatable base chamber 140 of the base cushion 130 through one or more cushion vent apertures.

In other embodiments, the inflatable base chamber 140, the first inflatable chamber 142, the second inflatable chamber 144, the third inflatable chamber 146, and/or any combination thereof may be coupled, or placed in fluid communication, with one another by one or more cushion vent apertures and/or valves.

Certain embodiments of the airbag 110 may include one or more valves (not shown) to control the flow of inflation gas of the inflatable airbag system 100. In some embodiments, one or more valves may be disposed in a main panel of the base cushion 130. In other embodiments, one or more of the cushion portions coupled with the base cushion 130 may define one or more valves of the airbag 110.

Other embodiments may include fewer than three cushion portions coupled with the base cushion 130. For example, an embodiment may include only two cushion portions, a first cushion portion 132 and a second cushion portion 134, each cushion portion coupled with the base cushion 130. Certain embodiments may include only a first cushion portion 132, the first cushion portion 132 coupled with the base cushion 130. However, an embodiment of the airbag 110 may include any suitable number of supplemental cushion portions, with one or more of the supplemental cushion portions coupled with the base cushion 130.

Figures 3C, 3D:
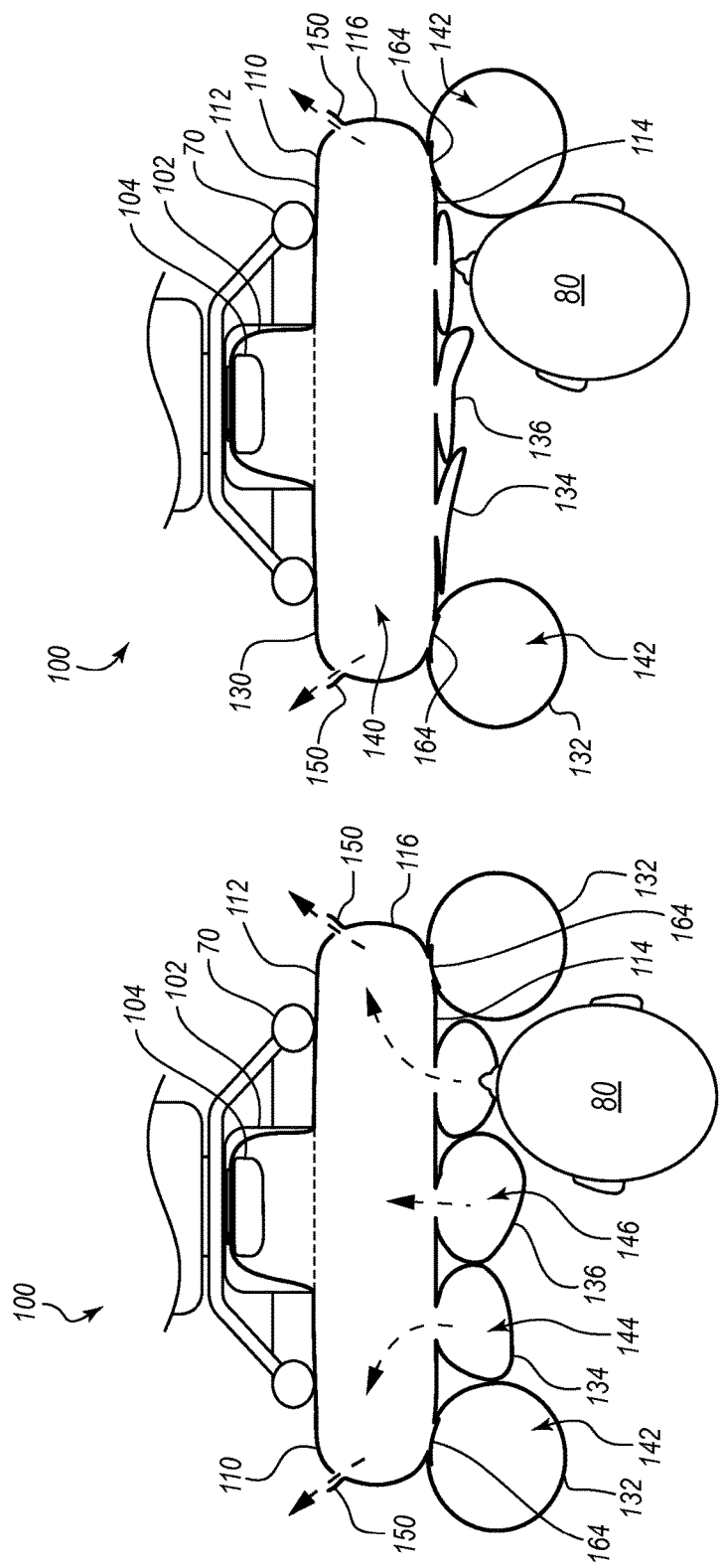
FIG. 3C is another top view of the inflatable airbag system of FIG. 1A, depicting the airbag in a deployed configuration receiving a head of a vehicle occupant.
FIG. 3D is another top view of the inflatable airbag system of FIG. 1A, depicting the airbag in a deployed configuration with a portion of the airbag deflated in response to having received the head of the vehicle occupant.
Figure 3E:
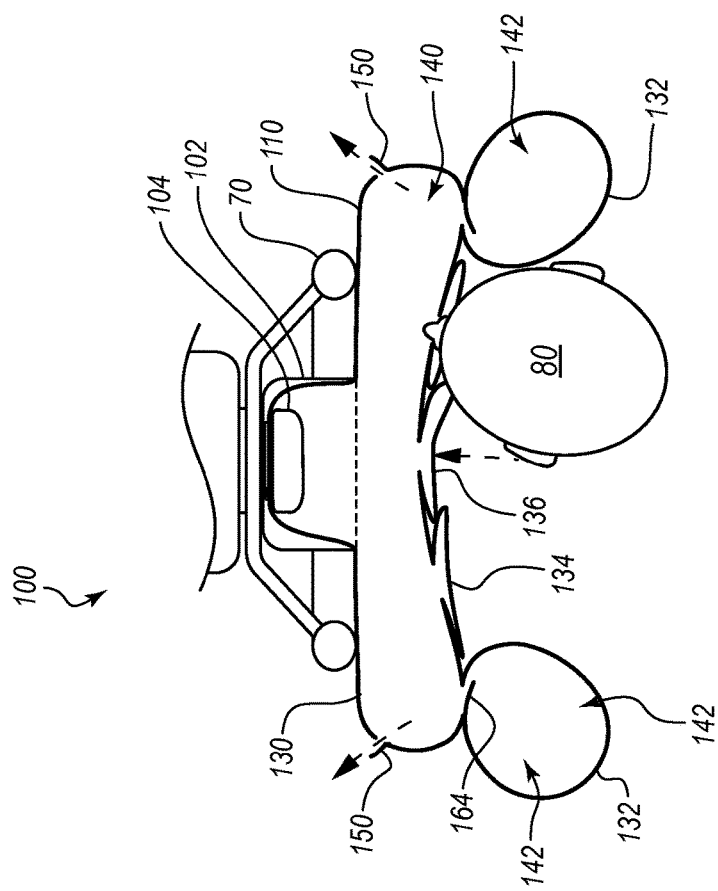
FIG. 3E is another top view of the inflatable airbag system of FIG. 1A, depicting the airbag in a deployed configuration with the airbag further deflated in response to having received the head of the vehicle occupant.

FIGS. 3A-3E are top views of the inflatable airbag system 100 of FIG. 1A, depicting the airbag 110 at various stages, including prior to deployment, following deployment of the airbag 110, and during a collision event. FIG. 3A is a top view of the inflatable airbag system 100 with the airbag 110 in a compact state or configuration prior to deployment. FIG. 3B is another top view of the inflatable airbag system 100 in which the airbag 110 is shown in a deployed configuration in response to a collision event. FIG. 3C is another top view of the inflatable airbag system 100 in which the airbag 110 is shown in a deployed configuration receiving a head 80 of a vehicle occupant. FIG. 3D is another top view of the inflatable airbag system 100 in which the airbag 110 is shown in a deployed configuration with a portion of the airbag 110 deflated in response to having received the head 80 of the vehicle occupant. FIG. 3E is another top view of the inflatable airbag system 100 depicting the airbag 110 in a deployed configuration with the airbag 110 further deflated in response to receiving the head 80 of the vehicle occupant.

Referring to generally and collectively to FIGS. 3A-3E, the inflatable airbag system 100 includes the airbag 110, which includes the base cushion 130 and the one or more of the supplemental cushion portions 132, 134, 136. The airbag 110 receives inflation gas from the inflator 104 to expand and deploy from the airbag housing 102.

The base cushion 130 may be formed by a plurality of panels 112, 114, 116 joined at edges or seams by one or more of stitching, one or more adhesives, taping, welding (e.g., radio frequency welding), heat sealing, or any other suitable technique or combination of techniques. In certain embodiments the base cushion 130 may be formed by one-piece woven (OPW) techniques in which the panels are integrally formed. The base cushion 130, as shown more clearly in FIGS. 3B-3D, may be configured in a cylindrical or drum shape, with a front panel 112 (e.g., steering wheel side panel), a rear panel 114 (e.g., occupant side panel positioned or otherwise configured to face toward the seating position), and a side panel 116 coupled along one side to the front panel 112 and along an opposite side to the rear panel 114. The front panel 112 forms a first base of the cylinder or drum shape and the rear panel 114 forms a second base of the cylinder or drum shape. The side panel 116 forms the side of the cylinder or drum shape. Tethers may extend between the front panel 112 and the rear panel 114 to provide support and/or maintain the cylinder or drum shape of the base portion 130.

In other embodiments, the base cushion 130 may be formed in a different shape or configuration. For example, the base cushion 130 may be form of simply the front panel 112 coupled to the rear panel 114, without a side panel 116, which may form a more pillow-shaped base cushion 130. Tethers may be used to maintain a desired contour or shape of the rear panel 114 for presentment of the supplemental cushion portions 132, 134, 136. For example, tether may be utilized to maintain the rear panel 114 in a substantially flat configuration.

The airbag 110 may include a plurality of cushion vent apertures between the base cushion 130 and one or more of the supplemental cushion portions 132, 134, 136. The plurality of cushion vent apertures may enable fluid communication between the base cushion 130, a first cushion portion 132, a second cushion portion 134, and a third cushion portion 136. More specifically, in some embodiments, the inflatable chambers 142, 144, 146 defined by the supplemental cushion portions 132, 134, 136 may also be in fluid communication with the inflatable base chamber 140 of the base cushion 130.

During deployment of the airbag 110, the inflatable chambers 142, 144, 146 may receive inflation gas from the inflatable base chamber 140. Following deployment of the airbag 110, one or more supplemental cushion portions 132, 134, 136 may receive the head 80 of the vehicle occupant. The inflatable chambers 142, 144, 146 may communicate inflation gas to the inflatable base chamber 140 (e.g., retrograde) as a response to having received the head 80 of the vehicle occupant.

One or more of the supplemental cushion portions 132, 134, 136 may include a valve configured to control the flow of inflation gas through a cushion vent aperture into and/or out of the inflatable chambers 142, 144, 146. For example, the first cushion portion 132 may include at least two valves 152 to control fluid communication into and/or out of the first inflatable chamber 142. The operation of the valves 152 of the first cushion portion 132 may be based or dependent on one or more of the pressure of the first inflatable chamber 142 and the pressure of the inflatable base chamber 140.

As described herein, the second cushion portion 134 and the third cushion portion 136 may deflate as they receive the head 80 of the vehicle occupant during a collision event. However, the valves 152 of the first cushion portion 132 may be one directional to allow airflow into the first inflatable chamber 142 and may restrict or prevent the first cushion portion 132 from deflating, even as the head 80 of a vehicle occupant impacts the airbag 110. The second and/or the third cushion portions 134, 136 may deflate in response to receiving the head 80 of the vehicle occupant. The first cushion portion 132 may remain fully expanded to receive the head 80 of the vehicle occupant, and may act as a barrier to limit, restrict, or prevent inboard, lateral, or sideways directed motion of the head 80.

In certain embodiments, the valves 152 of the first cushion portion 132 may include a valve panel 164 coupled to a panel or sidewall of the first cushion portion 132 at or adjacent to a cushion vent aperture. During deployment of the airbag 110, and during other suitable scenarios, the pressure of the inflatable base chamber 140 may be greater than the pressure of the first inflatable chamber 132. The valve panel 164 may extend away from a sidewall of the airbag 110, and may open the cushion vent aperture, allowing inflation gas to flow into the first inflatable chamber 142, as illustrated in FIG. 3B. Gradually pressure in the first inflatable chamber 132 reaches a point of equilibrium with, or exceeds, pressure in the inflatable base chamber 140 and the valves close to prevent flow of inflation gas back (e.g., retrograde) into the inflatable base chamber 140 from the first inflatable chamber 142.

During a collision event, the head 80 of a vehicle occupant may impact the airbag 110 and, in particular, may impact the first cushion portion 132. The impact may increase the pressure of the first inflatable chamber 142. When the pressure of the inflatable base chamber 140 is less than the pressure of the first inflatable chamber 142, the valve panel 164 may abut a sidewall of the airbag 110, closing the valve 152 and occluding or otherwise closing the corresponding cushion vent aperture. Closing the corresponding cushion vent aperture that provides fluid communication between the first inflatable chamber 142 and the inflatable base chamber 140 may prevent or restrict communication of inflation gas from the first inflatable chamber 142 into the inflatable base chamber 140, as illustrated in FIGS. 3C and 3D.

More generally, one or more valves may limit the flow of inflation gas between two inflatable chambers (e.g., the inflatable base chamber 140 and the first inflatable chamber 142) to a determined rate of flow. More generally, a valve may couple and provide controlled fluid communication between two inflatable chambers, allowing inflation gas to flow in one direction, while restricting the flow of inflation gas in another direction. Further, an embodiment of a valve may allow inflation gas to flow between the chambers based on the pressures of inflation gas existing in each chamber.

Still other embodiments of a valve may include an absolute pressure threshold of the valve, which pressure threshold must be exceeded by a source inflatable chamber in order to enable fluid communication between the source inflatable chamber and a destination inflatable chamber.

In other embodiments, one or more control valves may be configured to facilitate flow of inflation gas in either direction relative to the two inflatable chambers coupled by the valve. Such valves may be configured as bidirectional control valves, and may control the flow of inflation gas in either direction, and may do so according to any suitable valve configuration. Some embodiments of a valve may prevent the flow of inflation gas from a first inflatable chamber into a second inflatable chamber, unless the pressure of the first inflatable chamber exceeds the pressure of the second inflatable chamber by a determined pressure threshold. For example, in place of the valves 152 coupling the first inflatable chamber 142 and the inflatable base chamber 140, threshold valves may be utilized that may include a pressure threshold, which a pressure of the first inflatable chamber 142 relative to the inflatable base chamber 140 must exceed before the threshold valves may allow the communication of inflation gas from the first inflatable chamber 142 to the inflatable base chamber 140. Some embodiments may include one or more threshold valves configured to include pressure thresholds for both directions of fluid flow (i.e., flow from the first inflatable chamber 142 to the inflatable base chamber 140 and vice versa). In such embodiments, each pressure threshold of a direction of fluid flow may be configured to be different from, similar to, or identical with another pressure threshold.

The inflation gas pressure of an inflatable chamber may change based on one or more conditions of the cushion portion defining the inflatable chamber. For example, the pressure of an inflatable chamber may suddenly increase when a vehicle occupant, or the head 80 of a vehicle occupant, impacts the cushion portion that defines the inflatable chamber. Inflation gas may flow to a cushion vent aperture and from the inflatable chamber, in response to the increased pressure of the inflatable chamber.

In some embodiments, the second cushion portion 134 and the third cushion portion 136 may each be in fluid communication with the base cushion 130. In certain embodiments, a plurality of cushion vent apertures may enable the second inflatable chamber 144 and the third inflatable chamber 146 to each communicate inflation gas to the inflatable base chamber 140. The second and third inflatable chambers 144, 146 may communicate inflation gas to the inflatable base chamber 140 when the pressure of the second inflatable chamber 144 and/or the pressure of the third inflatable chamber 146 are greater than the pressure of the inflatable base chamber 140.

Thus, in some embodiments, an increase in pressure of the second and/or the third inflatable chambers 144, 146 may cause a volume of inflation gas to flow to the cushion vent apertures 154, 156 and into the inflatable base chamber 140. As described herein, the pressure of an inflatable chamber may increase when the head 80 of a vehicle occupant impacts a cushion portion defining the inflatable chamber. The volume of inflation gas may increase the pressure within the inflatable base chamber 140, which may in turn cause inflation gas to flow from the inflatable base chamber 140, through the valves 152, and into the first inflatable chamber 142, thereby raising the pressure within the first inflatable chamber 142 of the first cushion portion 132. The increased pressure within the first inflatable chamber 142 may cause the first cushion portion 132 to be more firm and thereby provide improved oblique crash protection for the head 80 of the occupant.

For example, as illustrated in FIG. 3C, following a collision event, the airbag 110 may receive the head 80 of the vehicle occupant. The impact of the head 80 may exert a force on the second and third cushion portions 134, 136, thereby increasing the pressure of the impacted cushion portions 134, 136. In response, inflation gas may be communicated to and through the cushion vent apertures 154, 156 of the cushion portions 134, 136. Inflation gas may flow from the cushion vent apertures 134, 136 and into the inflatable base chamber 140. The volume of inflation gas contained within the second and third inflatable chambers 144, 146 may decrease, and the second and third cushion portions 134, 136 may partially deflate. If the pressure of the inflatable base chamber 140 exceeds the pressure of the first inflatable chamber 142, inflation gas may flow from the inflatable base chamber 140 into the first inflatable chamber 142.

The base cushion 130 may also include one or more cushion vent apertures and/or valves 150 to vent inflation gas during ride-down of the occupant during a collision event. The rise of pressure in the inflatable base chamber 140 may cause the base cushion 130 to vent inflation gas through one or more cushion vent apertures and/or valves 150 of the base cushion 130.

In FIG. 3D, for example, the impact of a vehicle occupant with the airbag 110 may cause the second cushion portion 134 and third cushion portion 136 to deflate. However, the head 80 of the vehicle occupant may continue to exert a force on the base cushion 130, and may increase the pressure of the inflatable base chamber 140, causing the base cushion 130 to deflate. The base cushion 130 may deflate by communicating inflation gas to an exterior of the airbag 110 through the valves 150 disposed in the sides and/or front of the base cushion 130, as illustrated in FIG. 3E.

In certain collision events, such as in an oblique collision event, a vehicle occupant may impact the airbag 110 with a force that is oriented in a forward direction and in an inboard direction. In some embodiments, the first cushion portion 132 may be configured to receive the head 80 of the occupant, and may remain in an expanded state to prevent further inboard motion of the head 80 of the vehicle occupant. Any remaining forces applied on the airbag 110 by the vehicle occupant (e.g., by the occupant's continued momentum) after impacting the first cushion portion 132 may be applied to the base cushion 130, the second cushion portion 134, and/or the third cushion portion 136. Such scenarios may cause deflation of one or more inflatable chambers, and may cause communication of inflation gas to one or more other inflatable chambers. For example, in one embodiment, the base cushion 130 may communicate inflation gas to one or more inflatable chambers without venting inflation gas to an exterior of the airbag 110.

Figure 4B:
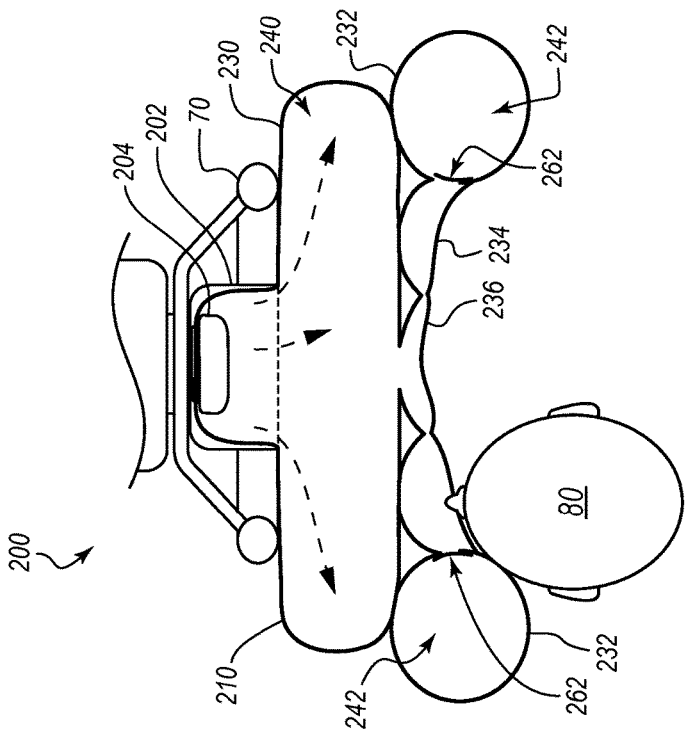
FIG. 4B is another top view of the inflatable airbag system of FIG. 4A, depicted after having received the head of the vehicle occupant.
Figure 4A:
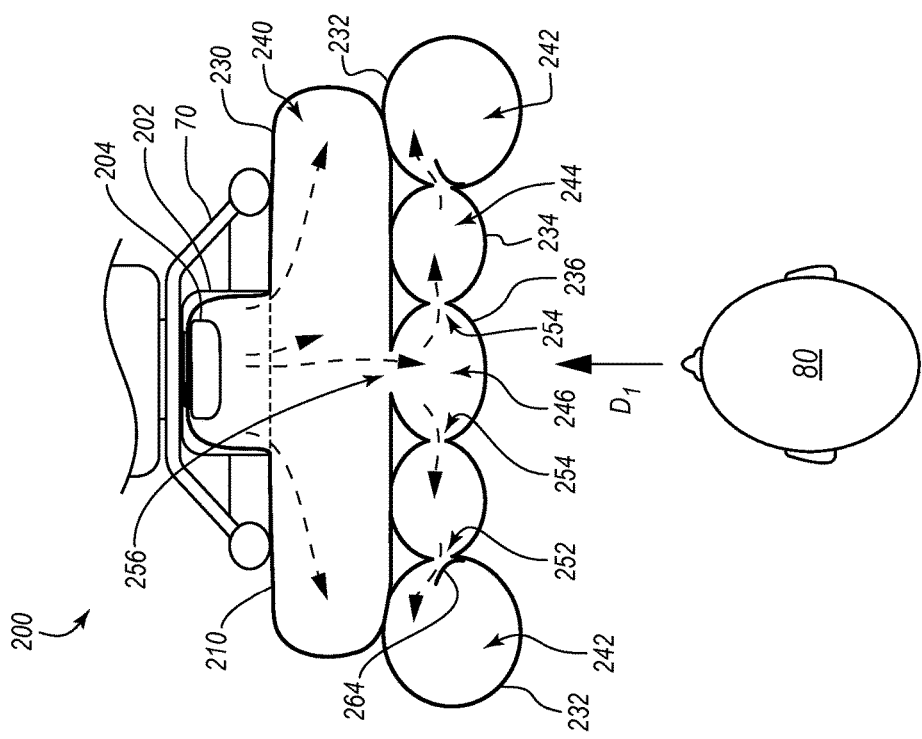
FIG. 4A is a top view of an inflatable airbag system, according to another embodiment of the present disclosure.

FIGS. 4A and 4B are views of an inflatable airbag system 200 according to another embodiment. The inflatable airbag system 200 may resemble the airbag system 100 described above in certain respects. Accordingly, like features are designated with like reference numerals, with the leading digits incremented to "2". Relevant disclosure set forth above regarding similarly identified features thus may not be repeated hereafter. Moreover, specific features of the inflatable airbag system 200 may not be shown or identified by a reference numeral in the drawings or specifically discussed in the written description that follows. However, such features may be the same, or substantially the same, as features depicted in other embodiments and/or described with respect to such embodiments. Accordingly, the relevant descriptions of such features apply equally to the features of the inflatable airbag system 200. Any suitable combination of the features and variations of the same described with respect to the inflatable airbag system 100 can be employed with the inflatable airbag system 200, and vice versa. This pattern of disclosure applies equally to further embodiments depicted in subsequent figures and described hereafter, wherein the leading digits may be further incremented.

FIGS. 4A and 4B are top views of an inflatable airbag system 200, according to another embodiment of the present disclosure. FIG. 4A is a top view of the inflatable airbag system 200 in an expanded state (e.g., as a result of deployment in response to a collision) and before impact by a head 80 of an occupant. FIG. 4B is a top view of the inflatable airbag system 200 during or after impact of the head 80 of the occupant.

Referring generally and collectively to FIGS. 4A and 4B, the inflatable airbag system 200 may include an airbag 210 that receives inflation gas from an inflator 204 to expand and deploy from a housing 202 and provide crash protection. The airbag system 200 may be configured to communicate inflation gas between one or more inflatable chambers 242, 244, 246 to provide improved crash protection during oblique collision events.

The inflatable airbag system 200 may include a base cushion 230, a first cushion portion 232, a second cushion portion 234, and a third cushion portion 236. The first cushion portion 232 may define a first inflatable chamber 242 and may be coupled to the base cushion 230. The first inflatable chamber 242 may be in fluid communication with a second inflatable chamber 244 that is defined by the second cushion portion 234.

The second inflatable chamber 244 may also be in fluid communication with a third inflatable chamber 246 defined by the third cushion portion 236. The second cushion portion 234 may be coupled with the base cushion 230. The third inflatable chamber 246 may be in fluid communication with the second inflatable chamber 244 and also with an inflatable base chamber 240 defined by the base cushion 230. The third cushion portion 236 may be coupled with the base cushion 230 in a manner similar to the first cushion portion 232 and the second cushion portion 234.

In certain embodiments, the one or more cushion portions 232, 234, 236 may be configured to inflate in a sequential order, or in series. In some embodiments, the inflatable airbag system 200 may be configured to communicate inflation gas to one or more inflatable chambers through another inflatable chamber, or through a plurality of inflatable chambers.

For example, during deployment of the airbag 210 of FIG. 4A, inflation gas may flow into the inflatable base chamber 240, and may begin filling the inflatable base chamber 240 with inflation gas. The inflatable base chamber 240 may continue to fill with inflation gas, sufficiently increasing the pressure of the base cushion 230 to cause inflation gas to flow through an aperture 256 into the third cushion portion 236 and begin to fill the third inflatable chamber 246. Filling the third inflatable chamber 246 with inflation gas may cause the third cushion portion 236 to deploy and transition from a compact state to an expanded state.

The pressure of the third inflatable chamber 246 may rise and cause inflation gas to flow through one or more cushion vent apertures 254 from the third cushion portion 236 to the second cushion portion 234. The inflation gas may then begin to fill the second inflatable chamber 244. Filling the second inflatable chamber 244 with inflation gas may cause the second cushion portion 234 to deploy and transition from a compact state to an expanded state.

Inflation gas may continue to flow into the deployed third cushion portion 236 and the deployed second cushion portion 234. The pressure of the second cushion portion 234 may rise and cause inflation gas to flow from the second cushion portion 234 through one or more cushion vent apertures 252 from the second cushion portion 234 into the first cushion portion 232. The inflation gas may then begin to fill the first inflatable chamber 242. Filling the first inflatable chamber 242 with inflation gas may cause the first cushion portion 232 to deploy and transition from a compact state to an expanded state.

The airbag 210 may include one or more valves. The one or more valves may control the flow or the communication of inflation gas between the third cushion portion 236, the second cushion portion 234, and the first cushion portion 232. For example, the one or more valves may facilitate fluid flow into the first cushion portion 232, and may restrict or prevent fluid flow out of the first cushion portion 232. The cushion vent aperture(s) 256 from the base cushion 230 to the third cushion portion 236 may include a one-directional valve to allow flow of inflation gas into the third cushion portion 236 and restrict or prevent flow of inflation gas retrograde back into the base cushion portion 230. Accordingly, a rise of pressure in the third inflatable chamber 246 (even to exceed the pressure in the inflatable base chamber 240) results in flow of inflation gas into the second cushion portion 234 and, in turn, the first cushion portion 232. The cushion vent apertures 252 from the second cushion portion 234 to the first cushion portion 232 may include a one-directional valve 262 to allow flow of inflation gas into the first cushion portion 232 and restrict or prevent flow of inflation gas retrograde back into the second cushion portion 234. Accordingly, the first cushion portion 232 is configured to maintain an inflation gas pressure within the first inflatable chamber 242 while receiving the head 80 or other portion of the occupant. In other words, the first cushion portion 232 remains expanded or in an expanded state during an impact from the head 80 or other portion of the vehicle occupant.

The airbag 210, and particularly the cushion vent apertures, valves, and cushion portions, can be tuned to allow more inward cushion portions, such as the second cushion portion 234 and the third cushion portion 236, to deflate and soften to receive (and in response to impact from) the head 80 or other portion of the vehicle occupant, while a more outward cushion portion, such as the first cushion portion 232, remains more firm to prevent the head 80 of the vehicle occupant from sliding off the airbag 210 when the occupant moves in an oblique direction relative to a direction of travel of the vehicle.

Other embodiments may include other arrangements or configurations of one or more cushion vent apertures or valves to maintain a more outer cushion portion firm to prevent the head 80 of the vehicle occupant from sliding off the airbag when the occupant moves in an oblique direction relative to a direction of travel of the vehicle. For example, another embodiment of an airbag may include a plurality of cushion vent apertures of a base cushion (e.g., similar to the base cushion 230). The plurality of cushion vent apertures of the base cushion may be arranged to fill an outermost cushion portion (e.g., similar to the first cushion portion 232) and subsequently fill other more inner cushion portions (e.g., similar to the second cushion portion 234 and third cushion portion 236) through one or more cushion vent apertures or valves of the outermost cushion portion.

More specifically, as the airbag deploys, one or more valves may allow inflation gas to flow from the base cushion into an outermost first cushion portion via corresponding cushion vent apertures. Inflation gas may flow from the outermost cushion portion into a second cushion portion via the cushion valves. Similarly, inflation gas may flow from the second cushion portion to an innermost third cushion portion 232 via at least one cushion vent aperture 254 of the second cushion portion 234.

Figure 5:
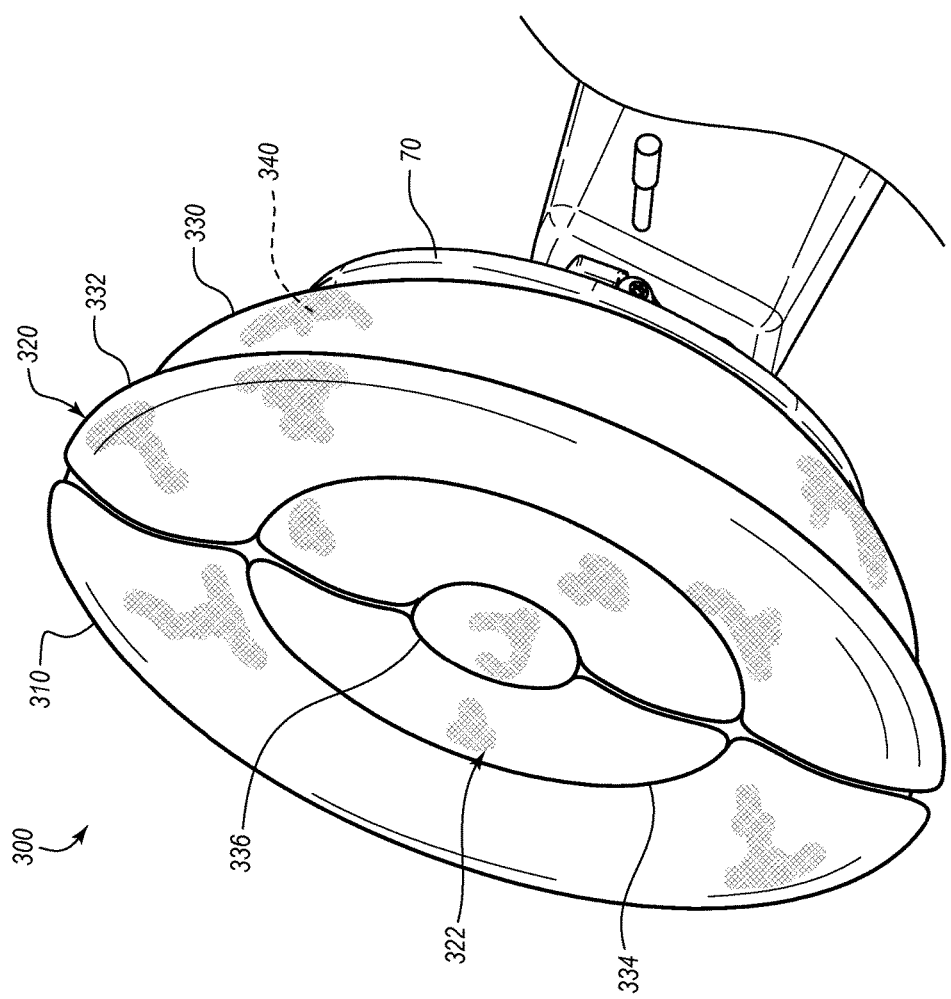
FIG. 5 is a perspective view of an inflatable airbag system depicted in a deployed configuration, according to another embodiment of the present disclosure.

FIG. 5 is a perspective view of an inflatable airbag system 300 depicted in a deployed configuration, according to one embodiment of the present disclosure. The airbag 310 may include an outer plurality of cushion portions 320, and an inner plurality of cushion portions 322. The outer plurality of cushion portions 320 may be a first set of cushion portions, and the inner plurality of cushion portions 322 may be a second set of cushion portions. Each cushion portion of the outer plurality of cushion portions 320 and the inner plurality of cushion portions 322 is coupled to a base cushion 330 of the airbag 310. Further, the cushion portions of the airbag 310 may each define a corresponding inflatable chamber.

In the illustrated airbag 310 of FIG. 5, the outer plurality of cushion portions 320 may include two arc-shaped cushion portions 332. The two arc-shaped cushion portions 332 may be disposed along an outer perimeter of the airbag 310, and may be arranged to abut one another along or at terminal regions of the arc-shaped cushion portions 332. Thus, when considered collectively, the outer plurality of cushion portions 320 may collectively form a ring, disposed along an outer perimeter of the airbag 310.

Similar to the outer plurality of cushion portions 320, the inner plurality of cushion portions 322 may include two arc-shaped cushion portions 334. The two arc-shaped cushion portions 334 may be disposed within an interior of the ring formed by the outer plurality of cushion portions 320, and may abut the outer plurality of cushion portions 320. In some embodiments, the inner plurality of cushion portions 322 may be arranged to abut one another along or at terminal regions of each arc-shaped cushion portion 334. Thus, when considered collectively, the inner plurality of cushion portions 322 may form a ring, disposed within an inner perimeter of the outer plurality of cushion portions 320.

In the embodiment of FIG. 5, the inner plurality of cushion portions 322 includes a center cushion portion 336 disposed at a center of a main panel of the base cushion 330. The center cushion portion 336 is disposed within an interior perimeter of the ring formed by the arc-shaped cushion portions 334 of the inner plurality of cushion portions 322. The center cushion portion 336 may also be considered a separate, third set of cushion portions (e.g., a set of one). In still other embodiments, the center cushion portion 336 may be replaced by a plurality of cushion portions, namely a third set of cushion portions.

In the embodiment of FIG. 5, the outer plurality of cushion portions 320, the inner plurality of cushion portions 322, and the center cushion portion 336 are concentric. Stated differently, first, second, and third sets of cushion portions are disposed or arranged around a common center of the airbag 310.

The base cushion 330 may include a plurality of cushion vent apertures (not shown), with each cushion vent aperture enabling a fluid communication between the base cushion 330 and one or more cushion portions 332, 334, 336 of any or all of the outer plurality (e.g., first set) of cushion portions 320, the inner plurality (e.g., second set) of cushion portions 322, and/or the center cushion portion (or third set of cushion portions) 336. The cushion vent apertures may be similar to and/or include those described above.

Similar to other embodiments described herein, each of the cushion portions (e.g., cushion portions 332, 334, 336) may deploy and/or inflate by filling with a volume of inflation gas. During deployment of the airbag 310, the base cushion 330 may communicate inflation gas to the plurality of cushion vent apertures of the base cushion 330. In certain embodiments, each cushion portion 332 of the outer plurality of cushion portions 320, and each cushion portion 334 of the inner plurality of cushion portions 322, may receive inflation gas from a cushion vent aperture of the plurality of cushion vent apertures. In other embodiments, one or more cushion portions 332, 334, 336 may receive inflation gas from a cushion vent aperture of the base cushion 330, and may communicate inflation gas to another adjacent cushion portion 332, 334, 336 through one or more additional cushion vent apertures.

However, each cushion portion 332, 334, 336 may receive inflation gas according to any suitable configuration of the airbag 310. For example, each cushion portion 332, 334, 336 may receive inflation gas from one or more cushion vent apertures of the base cushion 330. Or, the outer plurality of cushion portions 320 may receive inflation gas from the base cushion 330, and may communicate inflation gas inward, to the adjacent cushion portions of the inner plurality of cushion portions 322.

Further, the inflatable airbag system 300 may include one or more valves (not shown) to control the flow of inflation gas within the airbag 310. In some embodiments of an airbag 310, a valve may be disposed in a main panel of the base cushion 330.

In other embodiments, the outer plurality of cushion portions 320 may include a greater number of cushion portions, configured to abut one another, and to form a ring along an outer perimeter of the airbag 310. For example, some embodiments may include three arc-shaped cushion portions, four arc-shaped cushion portions, five arc-shaped cushion portions, six arc-shaped cushion portions, or any suitable number of cushion portions. In each of the preceding examples, when considered collectively, the cushion portions may be configured in a ring shape or to form a ring shape on a main panel of the base cushion 330. The ring shape may be disposed at or along an outer perimeter of the base cushion 330 of the airbag 310.

Figure 6:
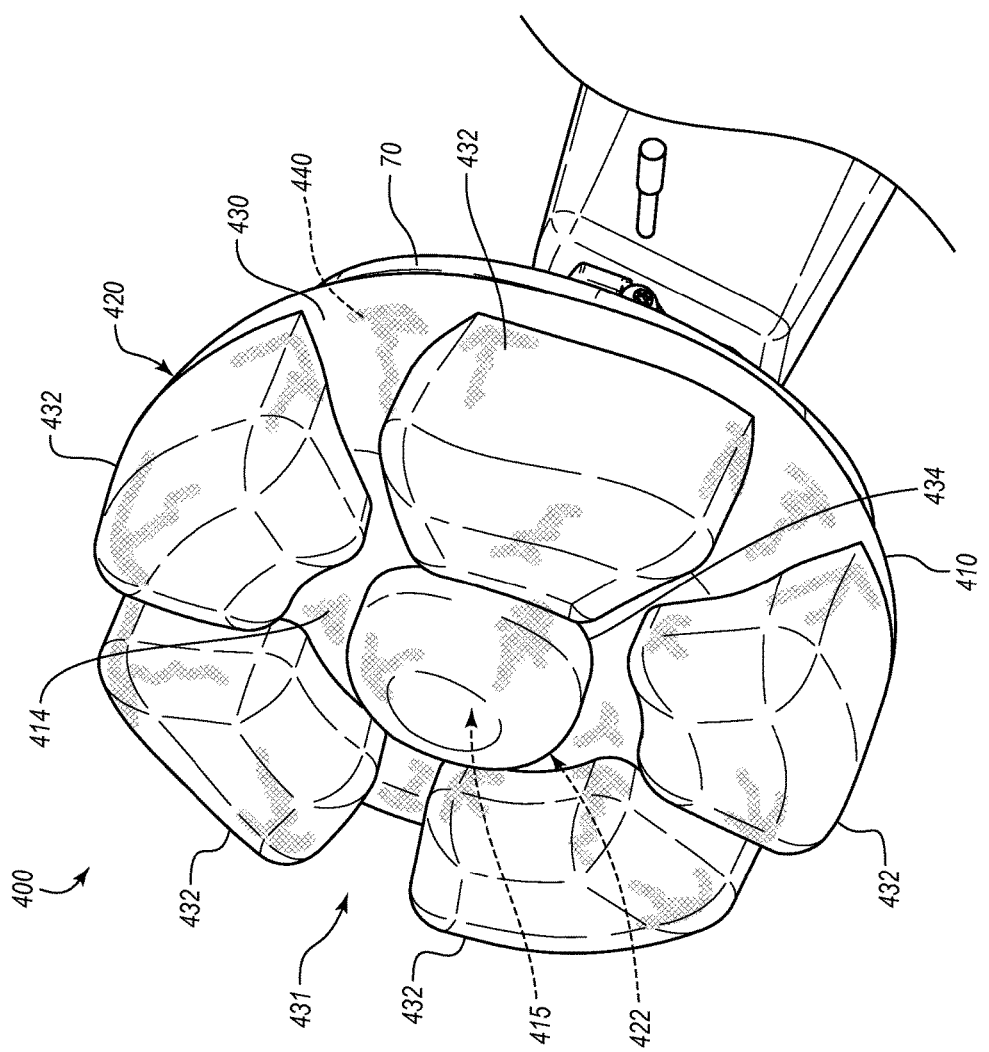
FIG. 6 is a perspective view of an inflatable airbag system, according to another embodiment of the present disclosure.

FIG. 6 is a perspective view of an inflatable airbag system 400, according to one embodiment of the present disclosure, in a deployed configuration. The airbag 410 may include a base cushion 430, an outer plurality of cushion portions 420 (e.g., a first set of cushion portions), and one or more inner cushion portions 422 (e.g., a second set of cushion portions). Each cushion portion 432 of the outer plurality of cushion portions 420, and each cushion portion 434 of the one or more inner cushion portions 422, is coupled to a main panel 414 (e.g., occupant facing pane) of the base cushion 430.

The base cushion 430 may inflate, expand outward away from a steering wheel 70 of the vehicle, and transition from a collapsed state into an expanded state and/or deployed state. Further, the base cushion 430 may include a plurality of cushion vent apertures (not shown). Each cushion vent aperture may enable fluid communication between (e.g., fluidly couple) the base cushion 430 to a cushion portion 432 of the outer plurality of cushion portions 420 and/or may couple the base cushion 430 to a cushion portion 434 of the one or more inner cushion portions 422.

The base cushion 430 may include a main panel 414 or rear (relative to the vehicle) sidewall. The main panel 414 may include an outer surface that may face a vehicle seating position, where a vehicle occupant may be seated in the seat of the vehicle. The main panel 414 may be shaped according to the shape of the airbag 410. Thus, the main panel 414 may be a circle or elliptical shape, and may include a center (or center region) 415. In some embodiments, the center 415 of the main panel 414 may be on a central axis of the airbag 410 of the inflatable airbag system 400.

In one embodiment, the outer plurality of cushion portions 420 may include five cushion portions 432 coupled with the main panel 414 of the base cushion 430. In other embodiments the outer plurality of cushion portions 420 may include four cushion portions 432; in other embodiments the outer plurality of cushion portions 420 may include six cushion portions 432. The outer plurality of cushion portions 420 may include any suitable number of cushion portions 432.

The outer plurality of cushion portions 420 may be arranged to form a ring at or along an outer perimeter of the outer surface, and/or the main panel 414, of the base cushion 430. The cushion portions 432 of the outer plurality of cushion portions 420 may be arranged with a space 431 or gap between any two adjacent cushion portions 432. Each of the plurality of spaces 431 may be an equal distance. In other words, the outer plurality of cushion portions 420 may be evenly spaced to collectively form a ring at or along an outer perimeter of the main panel 414 of the base cushion 430. The outer plurality of cushion portions 420 may be arranged without any two cushion portions 432 abutting one another.

The one or more inner cushion portions 422 may include a center cushion portion 434 disposed at, or proximate to, the center 415 of the airbag 410. Similar to other cushion portions (e.g., the outer cushion portions 432), the center cushion portion 434 may be in fluid communication with the base cushion 430 via one or more cushion vent apertures (not shown). The center cushion portion 434 may be disposed within an interior of a ring configuration or shape formed by the outer plurality of cushion portions 420.

In other embodiments, the one or more inner cushion portions 422 may include a plurality of cushion portions 434. For example, an inner plurality of cushion portions 422 may include three equally spaced cushion portions, arranged to form a ring that is concentric with the outer plurality of cushion portions 420. Further, the center cushion portion 434 may also be included (e.g., as a third set of cushion portions) and disposed at, or proximate to, a center 415 of the airbag 410.

Following the impact of the head of a vehicle occupant with the airbag 410, cushion portions 434 of the one or more inner cushion portions 422 may deflate. The one or more inner cushion portions 422 may deflate by communicating (or venting) inflation gas to the inflatable base chamber 440. Specifically, the impact of the occupant's head upon the airbag 410 may cause the pressure of one or more inner inflation chambers (not shown) to increase. The increased pressure may cause inflation gas to flow into the inflatable base chamber 440 via the cushion vent apertures (not shown) of the base cushion 430. By contrast, the plurality of outer cushion portions 420 may be configured to not deflate or maintain a relatively firm expanded state as compared to the one or more inner cushion portions 422. Valves and/or cushion aperture sizing may be tuned and/or otherwise utilized to restrict or limit flow of inflation gas out of the plurality of outer cushion portions 420.

One or more cushion portions of the inflatable airbag system 400 may include valves to control the flow of inflation gas within the airbag 400. In some embodiments, the cushion vent apertures coupling the base cushion 430 to the outer plurality of cushion portions 420 may include a valve to control the flow of inflation gas. The valve may be disposed in a main panel 414 of the base cushion 430, and may allow inflation gas to flow into the outer plurality of cushion portions 420, while restricting any flow of inflation gas out of the outer plurality of cushion portions 420, such as into the inflatable base chamber 440. In some embodiments, the valves of the outer plurality of cushion portions 420 may prohibit any inflation gas from flowing from a cushion portion 432 of the outer plurality of cushion portions 420 into the base cushion 430, and any other cushion or cushion portion.

Figure 7:
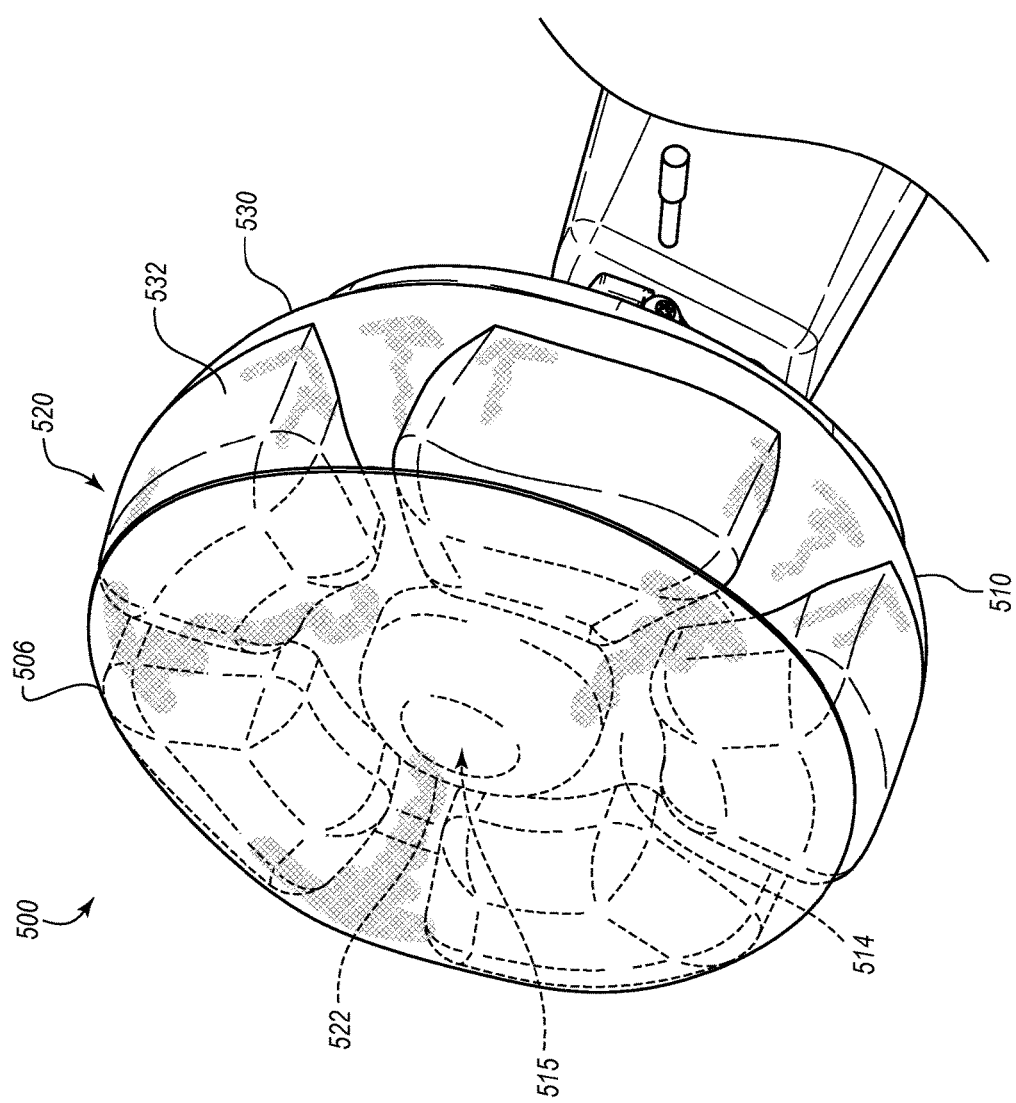
FIG. 7 is a perspective view of an inflatable airbag system, according to another embodiment of the present disclosure.

FIG. 7 is a perspective view of an inflatable airbag system 500, according to one embodiment, with an airbag 510 in a deployed configuration. The airbag 510 may be similar to one or more airbag embodiments described in relation to FIG. 6, having an outer plurality of cushion portions 520 and one or more inner cushion portions 522. In the embodiment of FIG. 7, the outer plurality of cushion portions 520 and the one or more inner cushion portions 522 are concentric or are arranged around a common center point or axis of the main panel 514. However, the airbag 510 may include an airbag membrane 506, or outermost panel 506, that may be coupled with one or more cushion portions (e.g., the outer plurality of cushion portions 520 and/or the one or more inner cushion portions 522) of the airbag 510.

The airbag membrane 506 may be disposed to cover the outer plurality of cushion portions 520 and the one or more inner cushion portions 522, and/or any other cushion portions coupled with the base cushion 530 of the airbag 510. The airbag membrane 506 may be configured to facilitate operation of the airbag 510, and may increase one or more friction forces exerted upon the head of a vehicle occupant by the airbag 510, as the head of the vehicle occupant impacts the airbag 510. Increasing the friction forces between the head of a vehicle occupant and the airbag 510 may facilitate reception of the head of the vehicle occupant by one or more portions of the airbag 510, and may limit roll-off and, in turn, injury of the vehicle occupant during a collision event.

For example, the airbag membrane 506 may overlap one or more pluralities of cushion portions that are configured according to the configurations and/or arrangements described previously. The airbag membrane 506 may span spaces or gaps between cushion portion (e.g., the outer plurality of cushion portions 520 and/or the one or more inner cushion portions 522) to form a continuous surface to receive the head of a vehicle occupant as it impacts the airbag 510. The airbag membrane 506, with the outer plurality of cushion portions 520 and the one or more inner cushion portions 522, may direct the motion of the head of the vehicle occupant toward a center 515 of the airbag 510, or toward the main panel 514 of the airbag 510. Thus, in a collision event, the airbag membrane 506 may facilitate reduction of any sideways or inboard motion of the head of the vehicle occupant. The airbag membrane 506 may create a more optimal impact surface for receiving the head of the vehicle occupant, including at spaces between cushion portions.

Figure 8:
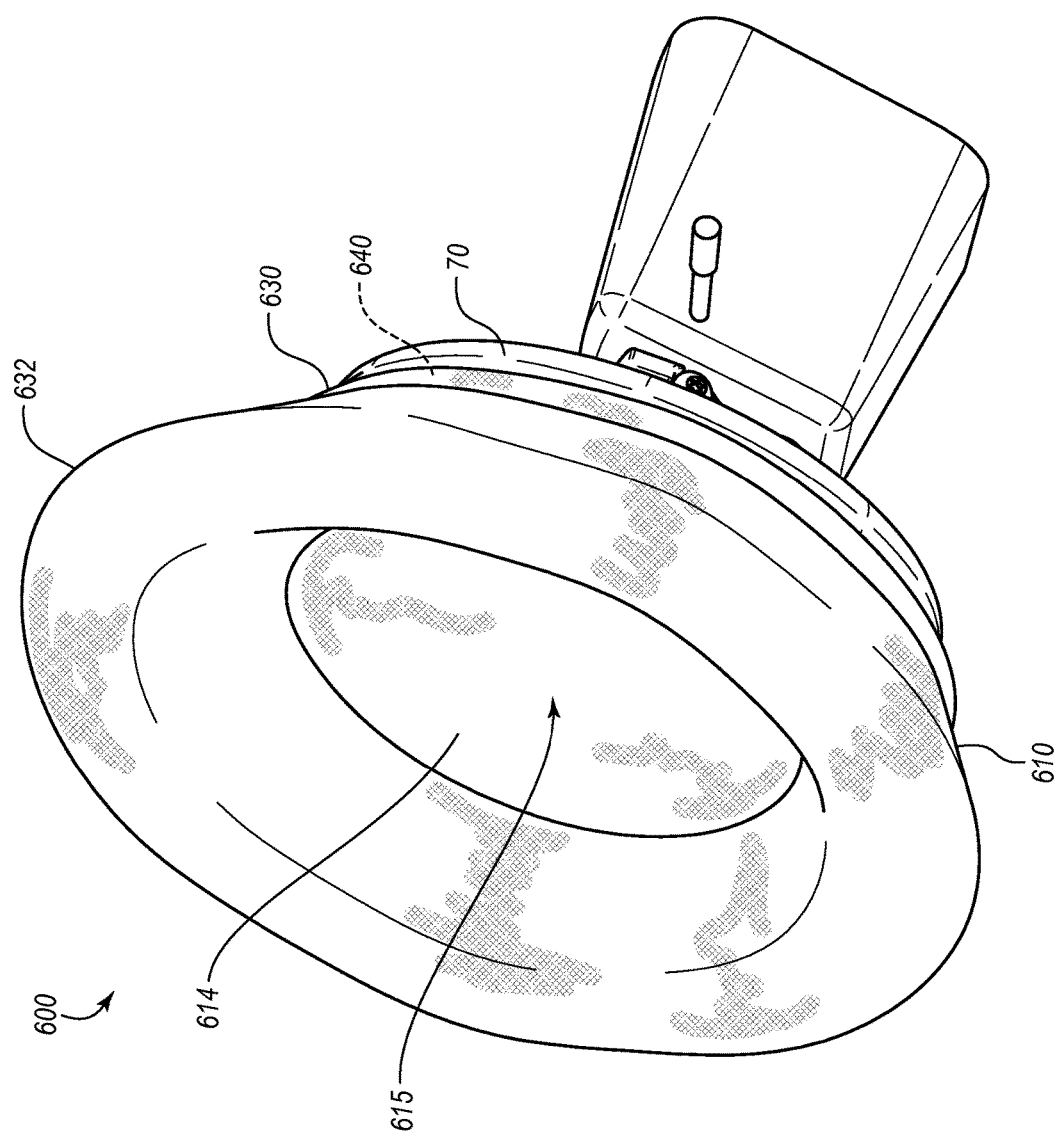
FIG. 8 is a perspective view of an inflatable airbag system, according to another embodiment of the present disclosure.

FIG. 8 is a perspective view of an inflatable airbag system 600 with an airbag 610 in a deployed configuration, according to one embodiment. The airbag 610 may include a base cushion 630 and a perimeter cushion portion 632 coupled with the base cushion 630.

The base cushion 630 may be configured according to any suitable manner. The base cushion 630 may define an inflatable base chamber 640 configured to receive a volume of inflation gas from an inflator upon deployment of the airbag 610. When the base cushion 630 has received a sufficient amount of inflation gas, the pressure of the inflation gas may cause the base cushion 630 to deploy, expanding away from a steering wheel 70 of the vehicle, and to transition from a compact state to an expanded state or deployed configuration.

The base cushion 630 may include a plurality of cushion vent apertures (not shown). Each cushion vent aperture may enable a fluid communication between the base cushion 630 and the perimeter cushion portion 632. In some embodiments, one or more of the cushion vent apertures of the base cushion 630 may include a valve to control the flow of inflation gas. For example, the cushion vent apertures may include a valve to facilitate the communication of inflation gas into the perimeter cushion portion 632, and may restrict or prevent communication of inflation gas from the perimeter cushion portion 632 to the base cushion 630.

The base cushion 630 may include a main panel 614, or front sidewall 614, of the base cushion 630. The main panel 614 may include an outer surface that may face a seating position or possibly a vehicle occupant. The main panel 614 may be shaped according to the shape of the airbag 610. Thus, the outer surface of the main panel may be elliptically shaped, and may include a center region 615. In some embodiments, the center region 615 of the outer surface may be a center 615 of the main panel 614. In some embodiments of the airbag 610, the center region 615 may be aligned on a central axis of the airbag 610.

The perimeter cushion portion 632 may form an expanded or extended ring along a circumference of the main panel 614 of the base cushion 630. Upon deployment or inflation, the perimeter cushion portion 632 may expand away from the main panel 614 of the base cushion 630, toward a seating position of the vehicle, or possibly toward a vehicle occupant. Further, when in a deployed configuration and/or expanded state, the perimeter cushion portion 632 may form a hollow cone or funnel shape. In some embodiments of the airbag 610, when the airbag 610 is in a deployed configuration, the perimeter cushion portion 632 may define a space to receive a vehicle occupant during a collision event. The space defined by the perimeter cushion portion 632 may be disposed within an interior of the hollow cone or funnel formed by the perimeter cushion portion 632.

During a collision event the head of a vehicle occupant may impact the airbag 610. The space defined by the perimeter cushion portion 632, and within an interior of the perimeter cushion portion 632, may receive the head of the vehicle occupant. One or more valves (not shown) of the perimeter cushion portion 632 may cause the perimeter cushion portion 632 to remain inflated or to remain in an expanded state. The perimeter cushion portion 632 may form a barrier preventing sideways, or inboard, directed motion of the vehicle occupant's head when received by the airbag, such as in the case of an oblique collision event.

In some embodiments, an airbag membrane (not shown) may be coupled with the perimeter cushion portion 632, and may cover the space formed by the perimeter cushion portion 632. During a collision event, the airbag membrane may receive the head of a vehicle occupant, and may respond to the impact by expanding, stretching, and/or distorting. By responding to the impact of the head of a vehicle occupant, the airbag membrane may slow the vehicle occupant's head and may minimize the stress placed upon the occupant and/or occupant's head as the airbag 610 receives the occupant.

Figure 9:
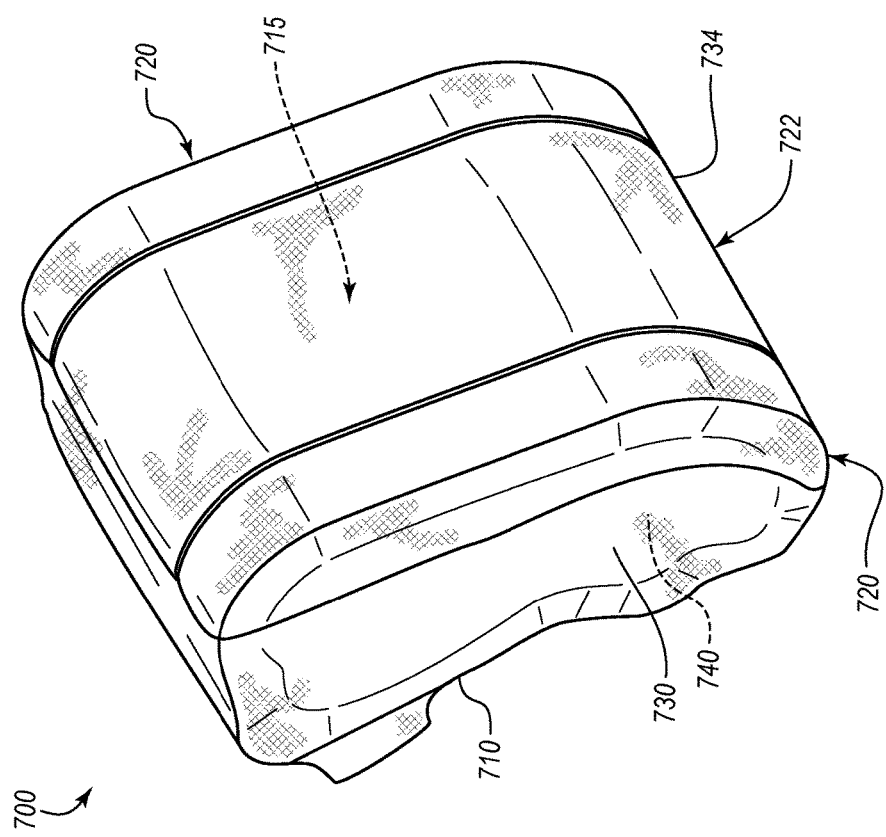
FIG. 9 is a perspective view of an inflatable airbag system, according to another embodiment of the present disclosure.

FIG. 9 is a perspective view of an inflatable airbag system 700 depicted in a deployed configuration, according to one embodiment of the present disclosure. The airbag 710 may be configured to be mounted or otherwise disposed in a vehicle dashboard 60 to deploy and receive a front passenger of the vehicle. The airbag 710 may include a base cushion 730, an outer plurality of cushion portions 720, and at least one inner cushion portion 722, with each cushion portion coupled with the base cushion 730.

The base cushion 730 defines an inflatable base chamber 740 that receives inflation gas from an inflator upon deployment of the airbag 710. When the base cushion 730 has received a sufficient amount of inflation gas, a pressure of the base cushion 730 may cause it to inflate and transition from a collapsed state into an expanded state and/or deployed state. In certain embodiments, the base cushion 730 may include a plurality of cushion vent apertures (not shown). Each cushion vent aperture may enable a fluid communication between the base cushion 730 and a cushion portion of the outer plurality of cushion portions 720 and/or an inner cushion portion 722.

The base cushion 730 may include a main panel (not shown) or rear sidewall of the base cushion 730. The main panel may include an outer surface that may face a vehicle seating position where a vehicle occupant may be seated. In some embodiments, the main panel (not shown) may be shaped according to the shape of the airbag 710. In some embodiments, the main panel may be rectangular.

Some embodiments of an airbag 710 may include a center region 715. In some embodiments of an airbag 710, the center region 715 may define a center of the main panel. In some embodiments of an airbag 710, the center region 715 may define a center of the airbag 710.

In one embodiment of an airbag 710, the outer plurality of cushion portions 720 may be coupled with the base cushion 730, such as on an occupant-facing surface of the base cushion 730. In such embodiments, a cushion portion of the outer plurality of cushion portions 720 may be disposed on each side of the base cushion 730. In other embodiments, the outer plurality of cushion portions 720 may include four cushion portions, with a cushion portion disposed along each edge of the base cushion 730. However, the outer plurality of cushion portions 720 may include any suitable number of cushion portions. The outer plurality of cushion portions 720 may be arranged at or along an outer perimeter of the main panel of the base cushion 730. The outer plurality of cushion portions 720 may be arranged with each cushion portion abutting the adjacent cushion portions of the outer plurality of cushion portions 720.

The at least one inner cushion portion 722 may include a center cushion portion 734 disposed at, or proximate to, the center 715 of the airbag 710. Similar to other cushion portions, the center cushion portion 734 may define an inflatable chamber in fluid communication with the base cushion 730 via one or more cushion vent apertures (not shown). The center cushion portion 734 may be disposed within an interior of the outer plurality of cushion portions 720 and also coupled to an occupant-facing surface of the base cushion 730.

During an oblique collision event, the head of a vehicle occupant may impact the airbag 710. The airbag 710 may receive the head of the vehicle occupant, deflate an inner cushion portion 722, and maintain a fully inflated, or fully expanded, configuration of the outer plurality of cushion portions 720. Thus, the airbag 710 may form a space to receive the head of a vehicle occupant, and the inflated outer plurality of cushion portions 720 may form a barrier to prevent sideways, or inboard, directed motion of the vehicle occupant's head, which may result from an oblique collision.

For example, as the head of a vehicle occupant impacts an inner cushion portion 722, the inner cushion portion 722 may deflate. The inner cushion portion 722 may deflate by communicating (or venting) inflation gas to an inflatable base chamber 740 of the base cushion 730. Specifically, the impact of the occupant's head upon the inner cushion portion 722 may cause the pressure of the inner cushion portion 722 to increase. The increased pressure may cause inflation gas to flow from the inner cushion portion 722 to the inflatable base chamber 740 through one or more cushion vent apertures (not shown) of the base cushion 730. The increased pressure within the inflatable base chamber 740 may cause additional inflation gas to pass into the cushion portions of the outer plurality of cushion portions 720.

In certain embodiments, the cushion portions of the outer plurality of cushion portions 720 may include valves to control the flow of inflation gas. For example, the cushion vent apertures coupling the base cushion 730 to the outer plurality of cushion portions 720 may include a valve to control the flow of inflation gas. The valves may allow inflation gas to flow into the outer plurality of cushion portions 720, while restricting any flow of inflation gas out of the outer plurality of cushion portions 720 and into the inflatable base chamber 740. In some embodiments, the valves of the outer plurality of cushion portions 720 may prohibit any inflation gas from flowing from a cushion portion of the outer plurality of cushion portions 720 into the base cushion 730, or any other cushion or cushion portion of the airbag 710.

Figure 10A:
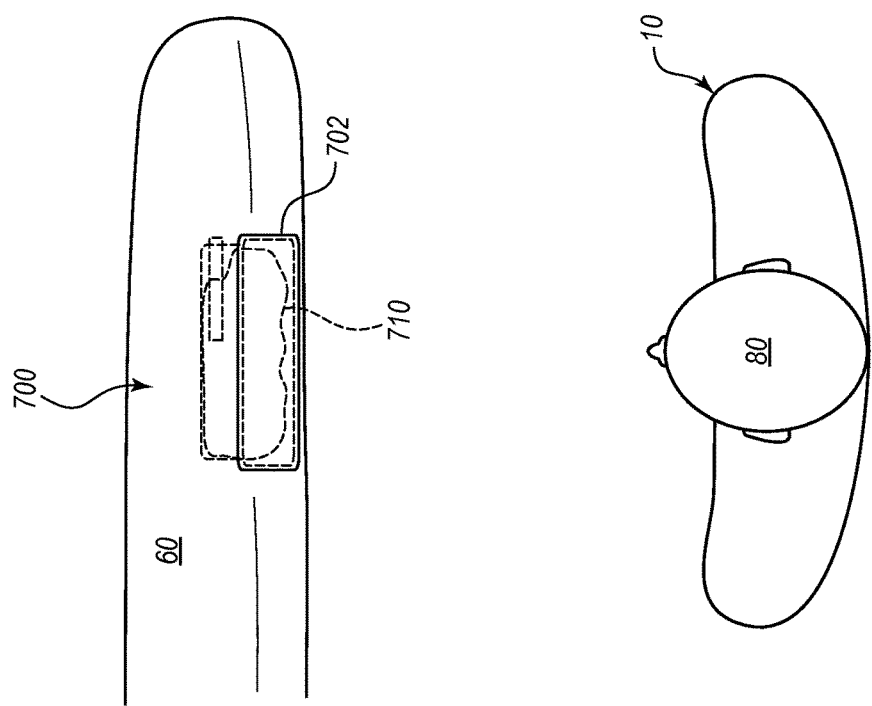
FIG. 10A is a top view of an inflatable airbag system, according to another embodiment of the present disclosure, depicting the airbag prior to deployment.
Figure 10B:
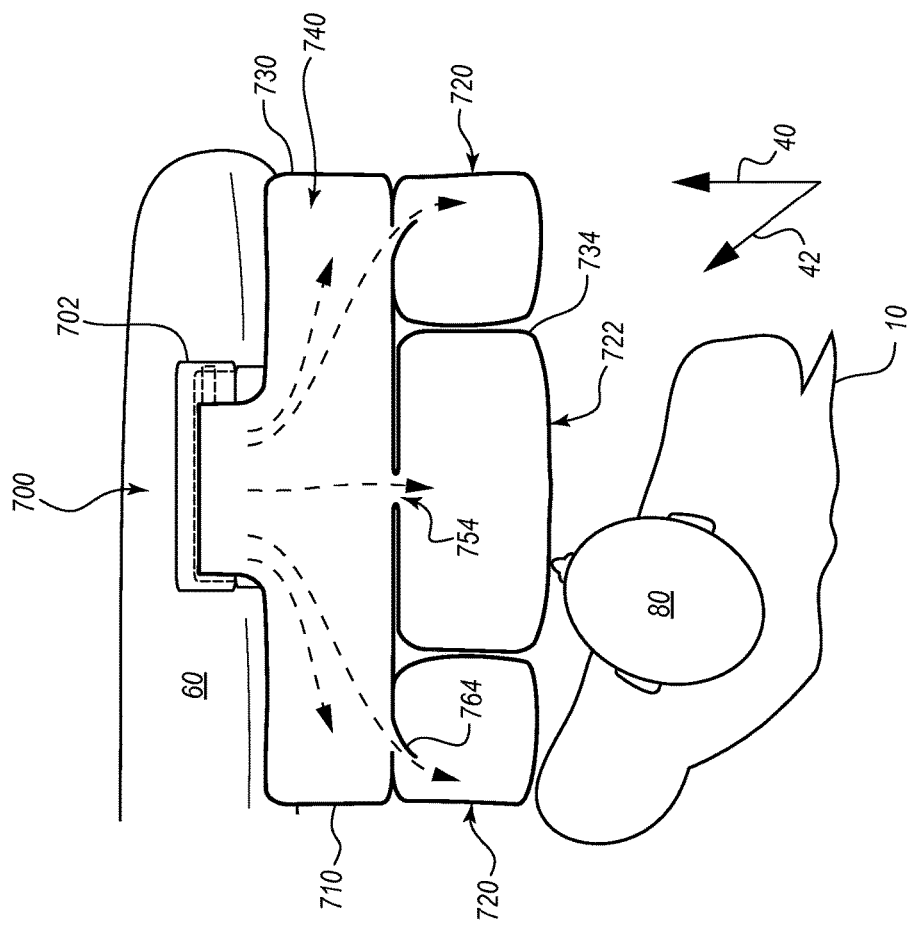
FIG. 10B is another top view of the inflatable airbag system of FIG. 10A, depicting the airbag in a deployed configuration in response to a collision event.
Figure 10C:
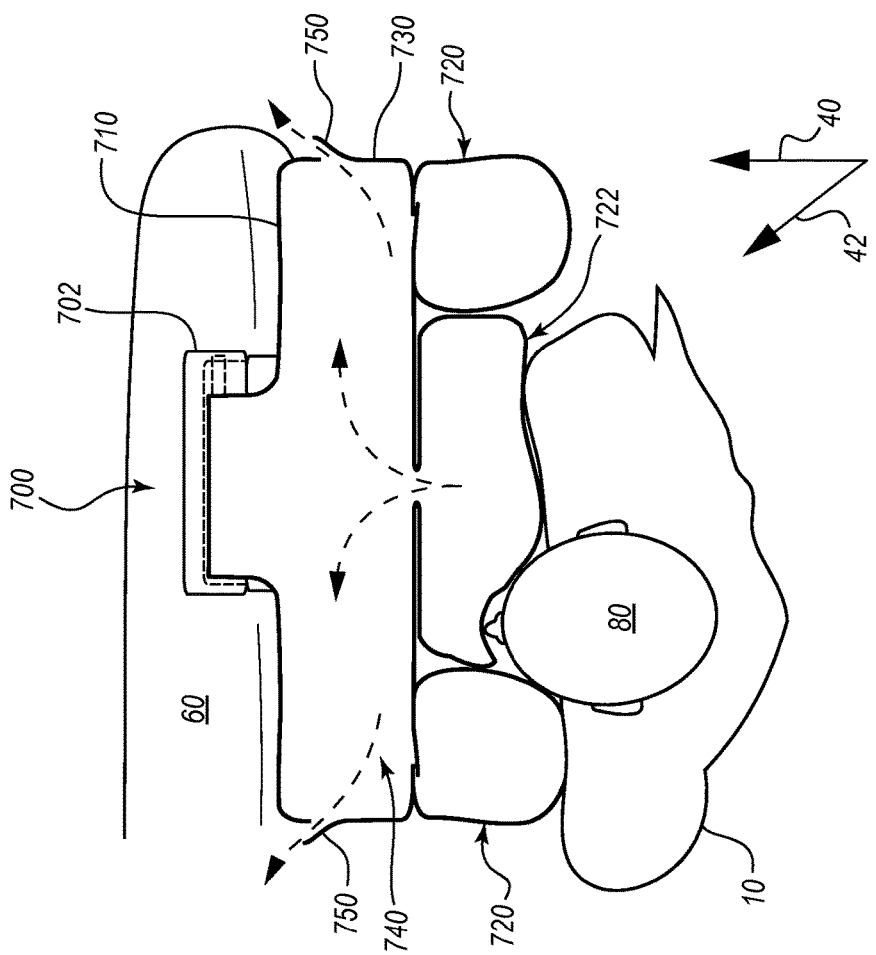
FIG. 10C is another top view of the inflatable airbag system of FIG. 10A, depicting the airbag in a deployed configuration in response to a collision event.
Figure 10D:
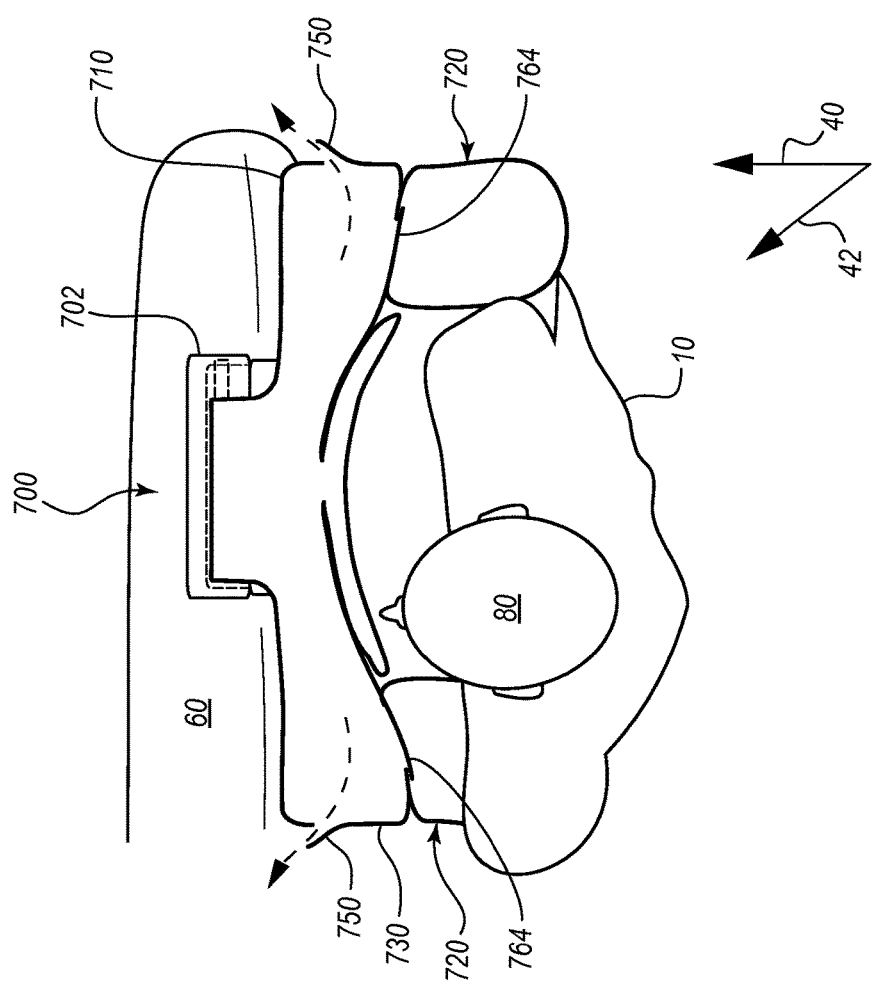
FIG. 10D is another top view of the inflatable airbag system of FIG. 10A, depicting the airbag in a deployed configuration in response to a collision event.

FIGS. 10A-10D are top views of the airbag system 700 of FIG. 9, with the airbag 710 depicted prior to deployment, following deployment, and during a collision event. FIG. 10A is a top view of the inflatable airbag system 700, with the airbag 710 in a compact state within an airbag housing 702 disposed in the dashboard 60 of a vehicle. FIG. 10B is another top view of the inflatable airbag system 700, in which the airbag 710 is shown in a deployed configuration in response to a collision event. FIG. 10C is another top view of the inflatable airbag system 700 in which the airbag 710 is shown in a deployed configuration receiving a head 80 of a vehicle occupant 10. FIG. 10D is another top view of the inflatable airbag system 700, in which the airbag 710 is shown in a deployed configuration with a portion of the airbag 710 deflated in response to having received the head 80 of the vehicle occupant 10.

Referring to FIGS. 10A-10D collectively, the airbag 710 may include a base cushion 730, an outer plurality of cushion portions 720, and at least one inner cushion portion 722. During a collision event, the airbag 710 of the inflatable airbag system 700 may deploy, and a vehicle occupant 10 may impact the deployed airbag 710. The airbag 710, and/or the cushion portions of the airbag 710, may reduce the motion of the head 80 of the vehicle occupant 10 that is oriented in a forward direction (i.e., toward a steering wheel of the vehicle) and possibly in an inboard direction.

As the airbag 710 receives the vehicle occupant 10, the inner cushion portion 722 may deflate to receive the head 80 of the vehicle occupant 10. However, the outer plurality of cushion portions 720 may remain in an expanded state (e.g., fully expanded or substantially fully expanded). While expanded, the outer plurality of cushion portions 720 may prevent the head 80 of the vehicle occupant 10 from moving in an inboard direction, and may prevent the head 80 of the vehicle occupant 10 from sliding or rolling off of the airbag 710.

The pressure of the inner cushion portion 722 may suddenly increase when a vehicle occupant 10, or the head 80 of a vehicle occupant 10, moves in a forward direction 40 and impacts the inner cushion portion 722. In response to the increased pressure of the inner cushion portion 722, inflation gas may flow to the base cushion 730, from the inner cushion portion 722, via the cushion vent aperture 754 of the base cushion 730.

The base cushion 730 may include one or more valves 750 to couple the base cushion 730 to an exterior of the inflatable base chamber 740. In some embodiments, when the pressure of the base cushion 730 exceeds a pressure threshold, the valves 750 of the base cushion 730 may vent inflation gas to an exterior of the inflatable base chamber 740, causing partial deflation of the base cushion 730.

In certain collision events, the head 80 of a vehicle occupant 10 may impact the airbag 710 with sufficient force to deflate the inner cushion portion 722. The head 80 of the vehicle occupant 10 may continue to exert force on the airbag 710 and may cause the base cushion 730 to vent inflation gas through the valves 750 coupling the base cushion 730 with an exterior of the inflatable base chamber 740. Alternatively, additional inflation gas may pass into the outer plurality of cushion portions 720, causing them to reach a more firm expanded state.

In certain collision events, such as in an oblique collision event, a vehicle occupant 10 may impact the airbag 710 with a force that is oriented in a inboard direction 42. In some embodiments, the outer plurality of cushion portions 720 may be configured to receive the head 80 of the vehicle occupant 10, and may prevent inboard motion of the head 80 of the vehicle occupant 10. The outer plurality of cushion portions 720 may include one or more valves, or valve panels 764 to control the flow of inflation gas of the outer plurality of cushion portions 720. In some embodiments, the valve panels 764 may prevent inflation gas from flowing from the outer plurality of cushion portions 720.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112, ¶6. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An inflatable airbag system that is configured to be mounted to a steering wheel of a vehicle, the inflatable airbag system comprising:
    a base cushion that defines an inflatable base cushion chamber configured to receive inflation gas from an inflator to expand the base cushion from a compact state to an expanded state, the base cushion including a plurality of cushion vent apertures disposed in an occupant-facing panel of the base cushion;
    a first set of cushion portions coupled to the occupant-facing panel of the base cushion, the first set of cushion portions arranged concentric with a center of the occupant-facing panel of the base cushion, the first set of cushion portions defining a first set of inflatable chambers each configured to receive inflation gas from a cushion vent aperture of the plurality of cushion vent apertures of the base cushion to expand the first set of cushion portions from a compact state outward toward a seating position of the vehicle to an expanded state; and
    a second set of cushion portions coupled to the occupant-facing panel of the base cushion, the second set of cushion portions arranged concentric with the center of the occupant-facing panel of the base cushion and the first set of cushion portions, the second set of cushion portions defining a second set of inflatable chambers each configured to receive inflation gas from at least one of a cushion vent aperture of the plurality of cushion vent apertures of the base cushion and a cushion vent aperture of an adjacent cushion portion of the first set of cushion portions to expand from a compact state outward toward the seating position to an expanded state,
    wherein the second set of cushion portions is disposed more centrally relative to the first set of cushion portions.

2. The inflatable airbag system of claim 1, wherein the first set of cushion portions comprises a single toroidal cushion portion that is toroidal in shape, and wherein the second set of cushion portions is arranged more centrally than the toroidal cushion portion such that the second set of cushion portions is disposed within a center area of the toroidal cushion portion.

3. The inflatable airbag system of claim 2, wherein the second set of cushion portions comprises a single cushion portion.

4. The inflatable airbag system of claim 1, wherein the first set of cushion portions comprises a plurality of cushion portions arranged about a circumference of the occupant-facing panel and around the second set of cushion portions.

5. The inflatable airbag system of claim 4, wherein the cushion portions of the first set of cushion portions are disposed in abutment one to another.

6. The inflatable airbag system of claim 4, wherein each cushion portion of the plurality of cushion portions of the first set of cushion portions is disposed a distance from an adjacent cushion portion.

7. The inflatable airbag system of claim 1, wherein each of the second set of cushion portions is further configured to communicate inflation gas to the at least one cushion vent aperture of the plurality of cushion vent apertures of the base cushion to transition from an expanded state to a deflated state in response to an impact of a head of a vehicle occupant with the second set of cushion portions.

8. The inflatable airbag system of claim 1, wherein the first set of cushion portions and the second set of cushion portions are elliptically shaped.

9. The inflatable airbag system of claim 1, further comprising a third set of cushion portions coupled to the occupant-facing panel of the base cushion, the third set of cushion portions arranged concentric with the center of the occupant-facing panel of the base cushion, the first set of cushion portions, and the second set of cushion portions, wherein the third set of cushion portions defines a third set of inflatable chambers that is configured to be disposed within a center of the second set of cushion portions and is configured to receive inflation gas from at least one of a cushion vent aperture of the plurality of cushion vent apertures of the base cushion and a cushion vent aperture of an adjacent cushion portion to expand from a compact state outward toward the seating position to an expanded state.

10. The inflatable airbag system of claim 9, wherein the third set of cushion portions is further configured to communicate inflation gas to the at least one cushion vent aperture of the plurality of cushion vent apertures of the base cushion to transition from the expanded state to the deflated state in response to an impact of a head of a vehicle occupant with the third set of cushion portions.

11. The inflatable airbag system of claim 1, wherein each of the first set of cushion portions, when in the expanded state, is configured to receive a vehicle occupant while retaining pressure of inflation gas within the inflation chambers defined by the first set of cushion portions and to remain expanded while receiving a head or other portion of a vehicle occupant.

12. The inflatable airbag system of claim 1, further comprising a housing from which the base cushion deploys from the compact state to the expanded state.

13. The inflatable airbag system of claim 1, further comprising an inflator in fluid communication with the base chamber to provide inflation gas to the base chamber upon actuation of the inflator.

14. An inflatable airbag system that is configured to be mounted to a steering wheel of a vehicle, the inflatable airbag system comprising:
a base cushion that defines an inflatable base cushion chamber configured to receive inflation gas from an inflator to expand the base cushion from a compact state to a deployed state, the base cushion including at least one cushion vent aperture disposed in an occupant-facing panel of the base cushion;
a first cushion portion coupled to the occupant-facing panel of the base cushion, the first cushion portion defining a first inflatable chamber in fluid communication with and configured to receive inflation gas from the base cushion through the at least one cushion vent aperture of the base cushion to expand the first cushion portion from a compact state outward toward a seating position of the vehicle to a deployed state; and
a second cushion portion coupled to the occupant-facing panel of the base cushion, the second cushion portion arranged concentric with the first cushion portion and defining a second inflatable chamber that is configured to receive inflation gas from at least one cushion vent aperture of the first cushion portion to expand the second set of cushion portions from a compact state outward toward the seating position to a deployed state, wherein the second cushion portion comprises a single toroidal cushion portion that is toroidal in shape, and wherein the first cushion portion is arranged more centrally than the toroidal cushion portion such that the first cushion portion is disposed within a center area of the toroidal cushion portion.

15. The inflatable airbag system of claim 14, further comprising a one-directional valve disposed in the at least one cushion vent aperture of the base cushion, the one-directional valve allowing inflation gas to pass in a single direction from the base cushion into the first cushion portion and limiting flow of inflation gas from the first cushion portion back to the base cushion.

16. An inflatable airbag system that is configured to be mounted to a steering wheel of a vehicle, the inflatable airbag system comprising:
a base cushion that defines an inflatable base cushion chamber configured to receive inflation gas from an inflator to expand the base cushion from a compact state to an expanded state, the base cushion including a plurality of cushion vent apertures disposed in an occupant-facing panel of the base cushion;
a first set of cushion portions coupled to the occupant-facing panel of the base cushion, the first set of cushion portions arranged concentric with a center of the occupant-facing panel of the base cushion, the first set of cushion portions defining a first set of inflatable chambers each configured to receive inflation gas from a cushion vent aperture of the plurality of cushion vent apertures of the base cushion to expand the first set of cushion portions from a compact state outward toward a seating position of the vehicle to an expanded state; and
a second set of cushion portions coupled to the occupant-facing panel of the base cushion, the second set of cushion portions arranged concentric with the center of the occupant-facing panel of the base cushion and the first set of cushion portions, the second set of cushion portions defining a second set of inflatable chambers each configured to receive inflation gas from at least one of a cushion vent aperture of the plurality of cushion vent apertures of the base cushion and a cushion vent aperture of an adjacent cushion portion of the first set of cushion portions to expand from a compact state outward toward the seating position to an expanded state,
wherein the first set of cushion portions is disposed more centrally relative to the second set of cushion portions.

17. The inflatable airbag system of claim 16, wherein the second set of cushion portions comprises a single toroidal cushion portion that is toroidal in shape, and wherein the first set of cushion portions is arranged more centrally than the toroidal cushion portion such that the first set of cushion portions is disposed within a center area of the toroidal cushion portion.

18. The inflatable airbag system of claim 17, wherein the second set of cushion portions comprises a single cushion portion.

* * * * *